US012741478B2

United States Patent
(12) United States Patent
Holmes et al.

(10) Patent No.: US 12,741,478 B2
(45) Date of Patent: Sep. 22, 2026

(54) OPTICAL DEVICE AND METHOD OF MANUFACTURE THEREOF

(71) Applicant: DE LA RUE INTERNATIONAL LIMITED, Basingstoke (GB)

(72) Inventors: Brian Holmes, Fleet (GB); Frederic Fournier, Thatcham (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 1087 days.

(21) Appl. No.: 17/638,463

(22) PCT Filed: Oct. 9, 2020

(86) PCT No.: PCT/GB2020/052519
§ 371 (c)(1),
(2) Date: Feb. 25, 2022

(87) PCT Pub. No.: WO2021/069918
PCT Pub. Date: Apr. 15, 2021

(65) Prior Publication Data

US 2022/0402292 A1 Dec. 22, 2022

(30) Foreign Application Priority Data

Oct. 11, 2019 (GB) ..................................... 1914770

(51) Int. Cl.
*G02B 5/18* (2006.01)
*B42D 25/29* (2014.01)
(Continued)

(52) U.S. Cl.
CPC ........... *B42D 25/328* (2014.10); *B42D 25/29* (2014.10); *B42D 25/373* (2014.10);
(Continued)

(58) Field of Classification Search
None
See application file for complete search history.

(56) References Cited

U.S. PATENT DOCUMENTS 6,141,124 A * 10/2000 Suzuki .................. G02B 5/201 349/5
8,314,989 B1 * 11/2012 Mossberg ............. G02B 27/44 63/32
2012/0262772 A1 * 10/2012 Louradour ............ H01S 3/0057 359/238

FOREIGN PATENT DOCUMENTS

EP 0059056 A1 9/1982
EP 0860298 A2 8/1998
(Continued)

OTHER PUBLICATIONS

Mar. 22, 2021 International Search Report issued in International Patent Application No. PCT/GB2020/052519.
(Continued)

*Primary Examiner* — Sharrief I Broome
*Assistant Examiner* — Journey F Sumlar
(74) *Attorney, Agent, or Firm* — Oliff PLC

(57) ABSTRACT

A method for forming an optical device and an optical device, wherein upon illumination, exhibits diffractive images dependent upon viewing angle, the device having a diffractive structure including grating regions, each region corresponding to a component of a respective diffractive image, wherein: each region of the diffractive structure includes grating elements along a first direction having a principal orientation component within the device plane that is substantially orthogonal to the first direction; wherein, the grating elements within each grating region have a constant pitch and the same orientation wherein each grating region, upon illumination, exhibits a diffractive color wherein the corresponding diffractive image is exhibited; wherein, the
(Continued)

diffractive structure includes first and second grating regions elongated along a common first direction, the regions being adjacent along the first direction, and wherein the pitch and/or orientation of the grating elements of the first and second grating regions are different.

23 Claims, 16 Drawing Sheets

(51) Int. Cl.

| | |
|---|---|
| ***B42D 25/328*** | (2014.01) |
| ***B42D 25/373*** | (2014.01) |
| ***B42D 25/405*** | (2014.01) |
| ***G02B 27/44*** | (2006.01) |
| *G03H 1/22* | (2006.01) |

(52) U.S. Cl.

CPC ......... *B42D 25/405* (2014.10); *G02B 5/1819* (2013.01); *G02B 27/44* (2013.01); *G03H 2001/2263* (2013.01)

(56) References Cited

FOREIGN PATENT DOCUMENTS

| | | | | | |
|---|---|---|---|---|---|
| EP | 1398174 | A1 | | 3/2004 | |
| EP | 3447546 | A1 | * | 2/2019 | ............. B42D 25/23 |
| GB | 2536769 | A | | 9/2016 | |
| GB | 2573816 | A | | 11/2019 | |
| JP | 2010-38940 | A | | 2/2010 | |
| WO | 83/00659 | A1 | | 3/1983 | |
| WO | 95/04948 | A1 | | 2/1995 | |
| WO | 95/10419 | A1 | | 4/1995 | |
| WO | 95/10420 | A1 | | 4/1995 | |
| WO | 00/39391 | A1 | | 7/2000 | |
| WO | 03/054297 | A2 | | 7/2003 | |
| WO | 03/095188 | A2 | | 11/2003 | |
| WO | WO-2018204982 | A1 | * | 11/2018 | ........... B42D 25/324 |
| WO | WO-2019180461 | A1 | * | 9/2019 | ........... B42D 25/324 |

OTHER PUBLICATIONS

Apr. 15, 2020 Search Report issued in Great Britian Patent Application No. 1914770.1.

* cited by examiner

Provide R,G,B grid pixels
S101
S102
Provide source image(s)
Generate dithering mask(s) based on source image(s)
S103
S104
Apply dithering mask(s) to grid pixels to generate template(s) of the source image(s)
Divide each template into template image segments and interlace image segments
S105
S106
Form diffractive structure corresponding to template of source image(s)

OPTICAL DEVICE AND METHOD OF MANUFACTURE THEREOF

FIELD OF THE INVENTION

The present invention is directed to optical devices and their method of manufacture. The invention is particularly applicable to the field of security devices, where such optical devices may be used as means of determining the authenticity of a security document such as a banknote or passport.

BACKGROUND TO THE INVENTION

Articles of value, and particularly documents of value such as banknotes, cheques, passports, identification documents, certificates and licences, are frequently the target of counterfeiters and persons wishing to make fraudulent copies thereof and/or changes to any data contained therein. Typically such documents are provided with a number of visible optical devices acting as security devices for checking the authenticity of the object. By "security device" we mean a feature which is not possible to reproduce accurately by taking a visible light copy, e.g. through the use of standardly available photocopying or scanning equipment. Examples include features based on one or more patterns such as microtext, fine line patterns, latent images, venetian blind devices, lenticular devices, moiré interference devices and moiré magnification devices, each of which generates a secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One class of optical devices are those which produce an optically variable effect, meaning that the appearance of the device is different at different angles of view and/or illumination. Such devices are particularly effective as security devices since direct copies (e.g. photocopies) will not produce the optically variable effect and hence can be readily distinguished from genuine devices. Optically variable effects can be generated based on various different mechanisms, including holograms and other diffractive devices, moiré interference and other mechanisms relying on parallax such as venetian blind devices, and also devices which make use of focusing elements such as lenses, including moiré magnifier devices, integral imaging devices and so-called lenticular devices.

The present invention is directed to diffractive devices that produce an optically variable effect. When white light is incident upon a diffraction grating, it is split into its constituent wavelengths (i.e. colours) according to the diffraction grating equation:

$$P(\sin\theta_i \pm \sin\theta_d) = m\lambda, \quad \text{(Equation 1)}$$

where P is the pitch of the grating elements of the diffraction grating, m is the diffraction order, λ is the wavelength of light, and $\theta_i$ and $\theta_d$ are the angle of incidence and diffraction, respectively, of light measured relative to the normal of the diffraction grating. When light is incident on the diffraction grating along a direction that is parallel to the diffraction grating normal, the equation simplifies to:

$$P\sin\theta_d = m\lambda, \quad \text{(Equation 2)}$$

This effect can be used to generate optical devices that exhibit colour images at particular viewing angles (corresponding to the angle of diffraction), with diffraction gratings of differing pitch being formed as an array of pixels such that, when illuminated, the device exhibits an image in accordance with the array of pixels.

As discussed above, the wavelength of light (and hence colour) exhibited by a diffraction grating upon illumination is dependent on the pitch, P, of the grating elements of the grating. The perceived quality (saturation and brightness) of the colour exhibited by a diffraction grating is dependent on the number of grating elements within that grating.

Firstly, the resolving power of a grating is a function of the number of grating elements within that grating. In more detail, when a diffraction grating is illuminated by polychromatic incident light, for a given wavelength A, the number of grating elements illuminated by the incident light determines the closest resolvable wavelength, $\lambda+\Delta\lambda$, with the resolving power R of the grating given by $R=\lambda/\Delta\lambda=mN$, where m is the order of diffraction and N is the number of illuminated grating elements. Hence, the resolving power of a diffraction grating increases with the number of grating elements. Therefore, an increased number of grating elements within a diffraction grating improves the ability of the viewer to resolve different colours in the replayed image. For the purposes of this specification, we will refer to an increase in the resolving power of a grating region as providing an increase in the "saturation" of the exhibited diffractive colour.

Secondly, the brightness of the light diffracted from a diffraction grating is also dependent on the number of grating elements present. When a diffraction grating is illuminated with polychromatic light, each incident wavelength λ will have diffraction maxima whose intensity (i.e. "brightness") is proportional to $N^2$, due to the reducing width of the maxima with increased N. Thus, the larger the number of grating elements within a diffraction grating, the greater the brightness (and hence contrast) of the exhibited image.

A particular problem arises in diffractive devices that are designed to exhibit a variable image. Such a variable image comprises two or more image frames that are viewable at different viewing angles of the device (typically the viewing angles are altered by tilting the device). This is in contrast to a device that exhibits a single ("static") image, i.e. exactly one image. The two or more image frames typically cooperate together in order to exhibit an animation or three-dimensional stereoscopic optical effect. In contrast to classical interferometric holographic techniques (where different views or images may overlap in the device), the use of diffraction gratings to provide such multiple-view devices requires that the diffraction gratings making up the multiple views are laterally spaced from each other (typically in an interlacing arrangement) in the device. Such variable images may be referred to as "spatially multiplexed" images.

When looking to increase the number of image frames exhibited by a device (for example in order to increase the difficulty of counterfeit), the size of the component diffraction gratings making up each image frame must be reduced in order that the repeat pattern of interlacing is not perceptible to the naked eye. Typically therefore, the diffraction gratings are reduced in size such that the repeat distance of the interlacing is less than 100 microns. However, this means that the number of grating elements within each component diffraction grating is reduced, adversely affecting the saturation and brightness of the colours in the replayed images for the reasons discussed above.

There is therefore a desire to overcome this problem in order to achieve more distinctive and recognisable optical effects and especially, in the field of security devices, to stay ahead of counterfeiters.

SUMMARY OF THE INVENTION

In accordance with a first aspect of the invention there is provided an optical device that, upon illumination, exhibits one or more diffractive images dependent upon viewing angle, said optical device having a diffractive structure comprising a plurality of grating regions, each grating region corresponding to a component of a respective diffractive image, wherein: each grating region of the diffractive structure comprises a plurality of grating elements arranged along a respective first direction, each grating element having a principal component of orientation within the plane of the device that is substantially orthogonal to said respective first direction; wherein, the grating elements within each grating region have a constant pitch and substantially the same orientation such that each grating region, upon illumination, exhibits a diffractive colour such that the corresponding diffractive image is exhibited; wherein, the diffractive structure comprises first and second grating regions that are both elongate along a common first direction, said first and second grating regions being adjacent along said common first direction, and wherein the pitch and/or orientation of the grating elements of the first and second grating regions are different.

The inventors have realised that the use of grating regions that are elongate (with the direction of elongation being along a common first direction) advantageously overcomes the problems outlined above and allows for the provision of optical devices exhibiting variable diffractive images (or high resolution single diffractive images) with significantly improved colour saturation and brightness as compared to devices employing conventional techniques. This is because the elongation along the first direction—which is the direction in which the device is intended to be viewed, as will be explained in detail herein—allows for an increased number of grating elements to be included within a grating region as compared to prior art devices when the grating regions are reduced in size in order to allow for multiple views or image frames to be exhibited by the device.

The reason for the adverse colour replay in conventional devices is that the grating regions typically have a square geometry due to the techniques used to rasterise (or "pixelate") an original colour image in order to form the device. Thus, as these grating regions of conventional diffractive structures become smaller (for example in order to include more image frames within a spatially multiplexed device), in order to maintain the square geometry of the grating regions, the number of grating elements arranged along the viewing direction within a grating region necessarily reduces for a given grating element pitch. This reduces the saturation and brightness of the replayed colours for the reasons discussed above in the background to the invention.

To overcome these problems, the inventors have realised that the resolving power of the grating regions is substantially independent of the grating region width. Thus, the use of grating regions that are elongate along the first (viewing) direction allows the number of grating elements within a grating region—and therefore the saturation and brightness of the resolved colours—to be maximised. Preferably, each grating region of the diffractive structure is elongate along its respective first direction.

Each grating region of the diffractive structure comprises a plurality of grating elements arranged along a respective first direction, with each grating element having a principal component of orientation within the plane of the device that is substantially orthogonal to the respective first direction. In other words, each grating element of the diffractive structure has an orientation within the plane of the device of between −44 degrees and +44 degrees (inclusive) with respect to a direction orthogonal to said first direction. The grating elements of the device each define a grating vector k perpendicular to its grating orientation. The plane of dispersion of each grating region (the plane within which incident white light is split into its component wavelengths) intersects the plane of the device along its grating vector. As each grating element has a principal component of orientation within the plane of the device substantially orthogonal to the respective first direction, each grating element defines a grating vector k that has a principal component of orientation along the first direction. Preferably at least one of the grating regions comprises grating elements orientated substantially perpendicular to the respective first direction.

Typically, each grating element of the diffractive structure has an orientation within the plane of the device of between −40 degrees and +40 degrees (inclusive), preferably between −30 degrees and +30 degrees (inclusive) and more preferably between −20 degrees and +20 degrees (inclusive), with respect to a direction orthogonal to the respective first direction.

The individual grating elements of the diffractive structure typically have linear geometry. However, it is also envisaged that individual grating elements of the diffractive structure may have a curved geometry. In such instances, the grating elements within a grating region have substantially the same curvature; in other words substantially the same orientation. In embodiments where the diffractive structure comprises curved grating elements, more than 50% of an individual grating element (and preferably each part of an individual grating element) has an orientation within the plane of the device of between −44 degrees and +44 degrees (inclusive) with respect to a direction orthogonal to said first direction. In this manner, such curved grating elements have a principal component of orientation within the plane of the device that is substantially orthogonal to its respective first direction.

Thus, the optical device is intended to be viewed within a viewing plane which intersects the device along the first direction. This viewing plane is referred to as the principal plane of dispersion. The device is intended to be viewed along a viewing direction within the principal plane of dispersion substantially parallel to the first direction.

In preferred embodiments, the respective first directions of each grating region are substantially the same (i.e. each grating region of the diffractive structure has a common first direction). In other words, the device is intended to be viewed within a single viewing plane which intersects the device along the common first direction. However, in other embodiments different grating regions may have different respective first directions, and in such embodiments the device is intended to be viewed within two (or more) viewing planes which intersect the device along the respective two or more first directions.

The diffractive structure comprises first and second grating regions that are both elongate along a common first direction, said first and second grating regions being adjacent along said common first direction, and wherein the pitch and/or orientation of the grating elements of the first and second grating regions are different. By elongate it is meant that a dimension of the grating region along the first direction is greater than a dimension of the grating region along a cross ("transverse") direction orthogonal to the first direction. Typically at least one grating region is elongate along its respective first direction by a ratio of at least 1.2 to 1, preferably at least 2 to 1. In preferred embodiments each grating region is elongate along the respective grating region by a ratio of at least 1.2 to 1, preferably at least 2 to 1. In preferred embodiments each grating region is elongate along the respective first direction by a ratio of at least 1.2 to 1, preferably at least 2 to 1. Particularly preferred ratios of elongation along the first direction are at least 10:1.

By "adjacent", it is meant that the first and second grating regions are consecutively arranged along said common first direction. Adjacent grating regions typically abut one another (may be said to be "directly adjacent"), but may not. In the case where the adjacent grating regions do not abut one another, there is a "gap" region between the adjacent grating regions which does not contain any grating elements such that the two adjacent grating regions are consecutively arranged.

Each grating region comprises a plurality of grating elements arranged along the respective first direction of that grating region. It is to be understood that as each grating element has a principal component of orientation within the plane of the device substantially orthogonal to the first direction, grating elements that are not aligned substantially orthogonally with the first direction are still considered be arranged along said first direction The device of the present invention exhibits one or more diffractive images dependent on viewing angle. The viewing angle is typically varied by tilting the device relative to the observer. Typically the device may be tilted about a first tilt axis that lies in the plane of the device and is substantially perpendicular to the first direction; and tilted about a second tilt axis the lies in the plane of the device and is substantially parallel with the first direction.

Herein, the term "image" refers to a graphic representation. Thus identical graphic representations but having different colours would be referred to as the same image as the graphical information content is the same. However, different graphic representations would be referred to as different images. The images of the present invention are preferably complex multi-coloured images.

When tilting the device about the first tilt axis, grating regions of different pitch will exhibit different diffractive colours according to Equation 2 (assuming, for simplicity, illumination of the device along its plane normal). Typically the pitches of the grating regions are such that the diffractive image(s) are exhibited at a first tilt angle $\theta$ or range of tilt angles (as measured from the plane normal of the device) between 30 degrees and 65 degrees, preferably between 35 degrees and 40 degrees. Away from the first tilt angle, an observer of the optical device will perceive a "false colour" image in that the observer will see a coloured image with different colours as compared to when viewing at the first tilt angle.

The optical device of the present invention is preferably configured to exhibit one or more multi-coloured diffractive images at the preferred tilt angle or range of tilt angles. In other embodiments the device may be configured to exhibit one or more achromatic (e.g. grayscale) diffractive images. In such achromatic embodiments, although each individual grating region exhibits a (typically red, green or blue) diffractive colour upon illumination, these diffractive colours are substantially balanced at the preferred tilt angle or range of tilt angles such that the viewer perceives a grey-white. Black may be perceived as a consequence of an absence of grating elements. Such achromatic techniques may be used to mimic a grayscale graduation.

When tilting the device about the second tilt axis (so as to vary a second tilt angle $\varphi$), grating regions having grating elements of different orientations will replay at different second tilt angles $\varphi$. This is due to the individual planes of dispersion of each grating region intersecting the principal plane of dispersion within which the viewer is viewing the device at different angles of tilt $\varphi$ about the second tilt axis.

The pitch and/or orientation of the first and second grating regions that are elongate and adjacent along the common first direction are different (i.e. the first and second grating regions have different grating characteristics). The first and second grating regions may be different components of the same diffractive image. This may be a single diffractive image exhibited by the device or an image frame of a variable image. In such a case the orientation of the grating elements in the first and second grating regions will be substantially the same in order that the diffractive image is exhibited at the same angle of tilt $\varphi$ about the second tilt axis. However, the grating elements will differ in pitch such that they exhibit different diffractive colours at a common tilt angle $\theta$ about the first tilt axis.

The first and second grating regions may be components of different diffractive images. In this case, the grating elements of the first and second grating regions will differ in orientation such that the different diffractive images are exhibited at different tilt angles about the second tilt axis. The first and second grating regions may also differ in pitch (i.e. exhibited colour).

Typically, the pitch and/or orientation of the grating elements of each adjacent grating region along a common first direction are different.

In general, the pitch and/or orientation of the grating elements of adjacent grating regions within the diffractive structure may be different. The adjacent grating regions may be adjacent along a common first direction, or along a direction offset (typically perpendicular to) a common first direction.

As discussed above, a particular advantage of the present invention is that the use of elongate grating regions allows the number of grating elements within a grating region to be maximised, particularly when reducing the size of the grating regions for use in spatially multiplexed devices for example. We now refer back to the relationship between the number of grating elements in a grating region and the saturation and brightness of the exhibited diffractive colour upon illumination. The optical device of the present invention is intended to be illuminated by white light, here meaning the visible part of the electromagnetic spectrum i.e. between about 390 to 700 nm. Whilst the wavelength ranges of red, green and blue light within the visible spectrum are relatively large (e.g. Red has a wavelength range of ~95 nm), transition colours within the visible spectrum such as yellow and cyan have much smaller wavelength ranges of the order 25-30 nm. Thus, in order that the transition colours are able to be resolved by the human eye, we require a value of $\Delta\lambda$=25 nm.

Thus, preferably, for first order diffraction (m=1), a wavelength corresponding to green light ($\lambda$=550 nm) and a $\Delta\lambda$ of 25 nm in order to resolve different colours (e.g. cyan and yellow which are either side of green in the electromagnetic spectrum), we can see that the number of grating elements N required is N=550/25=22. Similarly, for red light ($\lambda$=650 nm), 26 grating elements are required in order to observe colour separation, and for blue light ($\lambda$=480 nm), the number of grating elements required is 20.

Following this theory and allowing for imperfections of the human eye (e.g. the human eye does not perceive visible colour differences particularly well in the far red or far blue parts of the visible spectrum), grating regions comprising at least 20 grating elements allow for good colour saturation (resolving power). Therefore, in preferred embodiments, each grating region comprises at least 20 grating elements arranged along the respective first direction. In even more preferred embodiments, each grating region comprises at least 22 grating elements arranged along the respective first direction, preferably wherein each grating region comprises at least 26 grating elements arranged along the respective first direction. Of course, as already discussed above, increasing the number of grating elements within a grating region improves the brightness of the exhibited diffractive colours.

It is to be noted that the pitch of the grating elements within the regions (in addition to the number, N, of grating elements) may also be manipulated to further improve the replay of the colour image. For example, the smaller the grating pitch the greater the angular dispersion over which incident light is split into its constituent colours. In other words, a given wavelength of diffracted light is spread over a larger range of diffraction angles relative to the angle subtended by the eye's pupil at the typical viewing distance. Therefore, the smaller the grating pitch, the narrower the range of wavelengths that enter the eye of the observer, and hence the observer perceives a "purer" colour. As discussed above, typically the pitches of the grating regions are chosen such that the device exhibits the colour image at tilt angles $\theta$ (or range of tilt angles) about the first tilt axis of between 30 degrees and 65 degrees, preferably between 35 degrees and 40 degrees.

Particularly preferably, the grating elements within each grating region have a constant pitch, substantially the same orientation, and constant phase. In this manner, each grating region may be said to be "coherent". The grating elements within a grating region have a constant pitch along the direction of the grating vector.

The grating elements within a grating region preferably have a constant phase. As we have seen above, the resolving power and brightness of a grating region is dependent on the number of grating elements within that grating region. In order to ensure that the grating regions provide the necessary resolving power to achieve colour separation, the grating elements preferably have a constant phase, such that each grating element contributes to the resolving power of the grating region, and the brightness of the diffractive colour exhibited by that grating region. The grating elements within a grating region have a constant phase in the sense that they may be described by the same mathematical function. In other words, the position of a particular grating element within a grating region may be determined using a predetermined mathematical function that defines the grating structure of that grating region. For example, the amplitude variation of the grating elements within a grating region along the grating vector direction may be described by the following (continuous) mathematical formula:

$$\cos(Kx-\o),$$

where K is the wave-vector of value ($2\pi/P$) and ø is the phase term. For a coherent grating region with constant phase ø, if we know a value for the grating amplitude at one point of the grating region, we may mathematically or graphically predict all further amplitude values.

Such coherence is in contrast to situations where a grating region is composed of two separate sub-regions (for example due to manufacturing processes), where the spacing between the sub-regions means that the elements of the grating region as a whole do not have a constant phase (e.g. the spacing between the sub-regions is different to the spacing between the elements). The diffractive response of such a grating region comprised of two sub-regions which are not in phase is not the same (does not have the same wavelength resolving power) as the diffractive response of a coherent grating region in which the grating elements have a constant phase.

The grating elements of the diffractive structure define alternate bands of maxima and minima. The bands may take the form of alternating high and low optical densities (e.g. opaque bands spaced by transparent bands), in which case the diffractive effect will operate on the principle of amplitude-difference and the diffractive structure is a transmission amplitude grating structure. Alternating bands of high and low reflectivity would form a reflective amplitude grating structure. The grating elements may be in the form of physical peaks and troughs forming a surface relief, in which case the structure will be a phase-difference diffractive structure. In both cases the structure will be formed in or on a carrier, such as a layer of lacquer or resin. Where the diffractive structure is formed as a surface relief on the carrier, preferably a reflection-enhancing layer (such as metal or a high refractive index material) will be applied (e.g. by vacuum deposition) so as to follow the contours of the relief, to improve its visibility.

The surface relief may have different profiles, such as a sinusoidal, rectangular or triangular profile. The type of surface relief profile may affect diffraction efficiency, but it is the pitch of the grating elements that determines the angular dispersion or "spread" of colours—and hence the colour exhibited by a grating region at a particular viewing angle. Typically the profile depth of a surface relief defining the grating elements is no greater than 0.5 microns, preferably no greater than 0.25 microns.

Typically, each grating region has a maximum dimension along the respective first direction of 60 microns, preferably 50 microns, and more preferably 35 microns. Preferably, each grating region has substantially the same dimension along the respective first direction.

Preferably, the grating regions are arranged as one or more arrays corresponding to respective one or more said diffractive images. Thus, in embodiments where the optical device exhibits a single diffractive image, the grating regions may be arranged as a single array, with each grating region corresponding to a component of the single diffractive image. In embodiments where the device exhibits a plurality of image frames of a variable image, the grating regions are preferably arranged as a corresponding plurality of arrays, with each array corresponding to a respective diffractive image. The arrays are typically interlaced with each other along a direction substantially perpendicular to the first viewing direction of the device. The use of elongate grating regions advantageously reduces the repeat distance of the interlacing such that the repeating structure of the interlacing is not easily perceptible by the naked eye, whilst also maximising the number of grating elements that may be arranged along the first direction (and hence optimising the colour saturation and brightness in the replayed image).

In this way, the use of elongate grating regions allows an increased number of diffractive images to be exhibited by the device dependent on viewing angle. In particular, a plurality of diffractive images may be exhibited at corresponding different viewing angles dependent on the orientations of the grating elements within the respective elongate grating regions, rather than requiring the use of focussing elements such as lenses (as in lenticular devices for example). Indeed, preferably, the optical device of the present invention does not comprise any focussing elements (e.g. lenses).

Preferably, for at least one array (and typically all array(s)), the grating regions are arranged in accordance with a plurality of diffractive pixels of the corresponding diffractive image, each diffractive pixel being assigned a colour. Herein, a diffractive pixel may be used to refer to a region of the diffractive structure whose colour contribution to the respective diffractive image may be modulated by a corresponding grating region. As such, the diffractive structure may be considered to be comprised of a plurality of diffractive pixels (regions), each assigned a colour. As will be explained in more detail herein, when the optical device is illuminated with a light source, the contributions from each diffractive pixel combine to generate the diffractive image that is thus perceived by a viewer.

The plurality of diffractive pixels are typically arranged in a substantially contiguous manner. Preferably, for at least one array (and typically all array(s)), each diffractive pixel is elongate along the respective first direction.

The diffractive pixels typically have a square or rectangular geometry, although may have other geometries such as circular geometry. In embodiments where the diffractive pixels have rectangular geometry, the diffractive pixels are typically elongate along the first direction.

In some embodiments, for at least one array (and typically all array(s)), each diffractive pixel may be assigned a particular colour ("spot colour") of a colour palette (e.g. containing 256 colours), and the grating regions of the diffractive structure are formed in accordance with these assigned colours. In such embodiments the grating regions and the diffractive pixels typically have the same dimensions. Diffractive pixels may not comprise a grating region (e.g. if that diffractive pixel is desired to exhibit black). However, this approach of assigning grating regions of particular pitch to the diffractive pixels is computationally expensive and time consuming.

Therefore, in more preferred embodiments, for at least one array (and typically each array(s)), each grating region covers a proportion of a diffractive pixel corresponding to the proportion of the diffractive colour of the grating region to be exhibited by the diffractive pixel such that the corresponding diffractive image is exhibited. This advantageously allows a reduced number of "colour channels" to be used for so-called colour rendering, such that the diffractive image(s) are displayed upon illumination.

Preferably, for at least one array (and typically all array(s)), the diffractive pixels are arranged as an arrangement of image elements, wherein each image element comprises at least one diffractive pixel corresponding to a first colour channel and at least one diffractive pixel corresponding to a second colour channel; wherein, the array comprises a plurality of first grating regions that upon illumination exhibit a diffractive colour corresponding to the first colour channel, and a plurality of second grating regions that upon illumination exhibit a diffractive colour corresponding to the second colour channel; wherein, each first grating region covers a proportion of a first diffractive pixel corresponding to the proportion of the first colour channel to be exhibited by the associated image element, and each second grating region covers a proportion of a second diffractive pixel corresponding to the proportion of the second colour channel to be exhibited by the associated image element, such that the image elements exhibits a uniform colour.

Here by "uniform colour" we mean that the image element is perceived by the human eye to exhibit the same (constant) colour across its domain. In embodiments the image elements may correspond to image pixels of a source image to be exhibited.

It is to be noted that the proportional coverage of a diffractive pixel by a respective grating region ranges from 0% to 100% inclusive. The diffractive pixels are preferably elongate along the respective direction of their corresponding grating regions.

Thus, the diffractive structure comprises a plurality of first grating regions and a plurality of second grating regions arranged across the plurality of diffractive pixels. It is to be noted that the image elements and diffractive pixels may be considered as areas, or regions, of the optical device which help to define the positioning and relative sizes of the grating regions such that the optical device exhibits the diffractive image(s). In this manner, the contributions from each of the first and second grating regions (i.e. their respective colours and relative proportions thereof) when the optical device is illuminated combine such that the viewer perceives the uniform colours of the image elements making up the colour image.

The areal coverage of the diffractive pixels may be modulated (in order to exhibit the assigned colours of the image elements) by changing a dimension of the grating region(s) perpendicular to the respective first direction (typically by changing a width of the grating region). This beneficially maximises the number of grating elements arranged substantially along the first direction, in order to maintain good saturation and brightness of the replayed colours.

Indeed, typically, for at least one array (and typically each array(s)), each grating region and each diffractive pixel have substantially the same dimension along the respective first direction. Preferably, each diffractive pixel and each grating region are elongate along the respective first direction. In preferred embodiments, each grating region has substantially the same dimension along the respective first direction. In such embodiments, the areal coverage of each diffractive pixel may be modulated by changing only a dimension of each grating region along a direction perpendicular to the first direction (e.g. changing a width of the grating region).

Preferably, the arrangement of diffractive pixels within each image element is substantially the same. In other words, the number, size and relative position of each diffractive pixel within each image element is substantially the same. For example, each image element may comprise exactly one first diffractive pixel and exactly one second diffractive pixel arranged side-by-side so that the dimensions of the diffractive pixels and the image element in the first direction are equal, and the dimensions of the diffractive pixels orthogonal to the first direction are half that of the image element. In other embodiments, each diffractive pixel may comprise two or more first diffractive pixels and the same number of second diffractive pixels.

Typically, the arrangement of diffractive pixels within an image element is such that the diffractive pixels cover substantially the entire area of the image element. Preferably, each diffractive pixel has substantially the same dimensions.

Preferably, the area of the first diffractive pixel(s) within an image element is substantially the same as the area of the second diffractive pixel(s) within that image element. In other words, typically, the combined area of the diffractive pixels corresponding to each colour channel (e.g. within each image element and across the diffractive structure as a whole) is substantially the same.

Preferably, the plurality of diffractive pixels are arranged in a substantially contiguous manner. In other words, the diffractive pixels abut one another. Thus, the image elements themselves are also preferably arranged in a substantially contiguous manner.

In preferred embodiments, for said at least one array (and typically each array(s)), each image element further comprises at least one third diffractive pixel corresponding to a third colour channel; wherein the array further comprises a plurality of third grating regions that upon illumination exhibit a diffractive colour corresponding to the third colour channel; wherein, each third grating region covers a proportion of a third diffractive pixel corresponding to the proportion of the third colour channel to be exhibited by the associated image element such that the image element exhibits a uniform colour. The first, second and third colour channels preferably correspond to red (R), green (G) and blue (B) colour channels.

The human eye typically has an angular resolution of approximately 1 minute of arc. This means that an observer viewing the optical device at a distance of (generally) between 25 cm and 30 cm may resolve features having dimensions between approximately 75 microns and 100 microns, allowing for imperfections of the human eye. Accordingly, a repeating spatial region (or "domain") of the diffractive structure is preferably 100 microns or smaller, more preferably 75 microns or smaller such that they are not readily discernible to the naked human eye.

In the case of an optical device that exhibits a single diffractive image, this repeating domain is typically an image element. In such embodiments therefore, for at least one array, each image element preferably has a maximum dimension of 100 microns, preferably 75 microns, more preferably 50 microns and even more preferably 35 microns.

In the case of an optical device that exhibits two or more image frames of a variable diffractive image, the repeating domain is the (typically interlaced) arrangement of grating regions corresponding to the respective image frames. In other words the size of the repeating domain is a function of the number of image frames of the variable image. As we have seen above, typically each grating region has a maximum dimension along its respective first direction of 60 microns, preferably 50 microns, and more preferably 35 microns. The grating regions typically have a dimension orthogonal to the first direction of at least 2 microns in order that unintended "aperture" diffractive effects do not become prevalent, ensuring that the replayed diffractive colours dominate the optical effect exhibited by the optical device.

Preferably, for at least one array, each diffractive pixel has a maximum dimension along the respective first direction of 60 microns, preferably 50 microns and more preferably 35 microns. Preferred dimensions for the diffractive pixels along the respective first direction are between 15 and 35 microns, more preferably between 20 and 30 microns. Typically, for at least one array, each diffractive pixel has a dimension orthogonal to the respective first direction of between 2 microns and 30 microns, preferably between 5 microns and 12 microns. In some embodiments, each diffractive pixel has a dimension orthogonal to the respective first direction of between 2 microns and 7 microns, preferably between 2 microns and 5 microns. In such embodiments, each grating region of the device will accordingly have a dimension orthogonal to the respective first direction of between 2 microns and 7 microns, preferably between 2 microns and 5 microns.

In single image embodiments, each grating element of the diffractive structure has substantially the same orientation within the plane of the device (typically orthogonal to the first direction). However, in particularly preferred embodiments of the invention, the optical device exhibits two or more diffractive images dependent on viewing angle, and wherein the grating elements of the respective two or more arrays have different orientations within the plane of the device such that the said two or more diffractive images are exhibited at different viewing angles.

The grating elements of different arrays define grating vectors having different orientations within the plane of the device. Due to the different orientations of the grating elements within the different arrays, the planes of dispersion of the grating regions of each image intersect with the principal plane of dispersion as the device is tilted and consequently the diffractive images are exhibited at different viewing angles.

Typically, the two or more diffractive images are selectively exhibited as the device is tilted about a tilt axis lying within the plane of the device, preferably wherein the second tilt axis is substantially parallel with the first direction (the "second tilt axis" referred to above). When said second tilt axis is substantially parallel with the first direction, the grating elements of the exhibited images each have a principal component of orientation that is substantially orthogonal to the first direction. Typically a first diffractive image is exhibited at a first angle (or range of angles) of tilt about the second tilt axis and a second, different, diffractive image is exhibited at a second, different, angle (or range of angles) of tilt about the second tilt axis.

The exhibiting of two or more diffractive images as the device is tilted provides a particularly striking effect for the observer, especially if the first and second diffractive images combine to provide an animation or three-dimensional visual effect. Typically, the two or more diffractive images are frames of a variable spatially multiplexed colour image. Typically such a device may exhibit at least 15, more preferably at least 20, frames in order that a smooth animation effect is perceived by the observer when tilting the device.

In embodiments where two or more diffractive images are exhibited by the device, typically each of the two or more arrays are arranged as respective sets of diffractive image segments that in combination exhibit the respective diffractive image, and wherein the sets of image segments of the two or more arrays are interlaced with each other.

Typically, the diffractive image segments are elongate and the direction of interlacing is substantially perpendicular to the direction of elongation. Thus, if the first direction is aligned north to south ("vertically") on the device, the diffractive image segments are preferably interlaced along the east-west direction ("horizontally").

A particular advantage of the present invention is that the interlacing order of the image segments is not constrained by the use of a focussing element (e.g. lens), as is the case in lenticular devices configured to replay different images dependent on viewing angle. In such lenticular devices, the interaction between the lens and the image segments means that the image segments need to be arranged within the device in the same order of desired replay. However, in the optical device of the present invention, the order of replay upon tilting the device is dependent on the orientation of the grating elements. Thus, in some embodiments, the diffractive image segments are interlaced (e.g. within the diffractive structure) in a first order that is different to a second order in which the respective diffractive images are exhibited as the device is tilted.

Preferably, a repeat distance of the arrangement of diffractive image segments is not discernible by the naked human eye. This ensures that when an observer views the optical device, he/she only readily perceives the diffractive images formed by the respective image segments, rather than perceiving the individual image segments themselves, or artefact patterns resulting from the interleaving that may detract from the desired visual effect. Herein, the term "repeat distance" is used to refer to a dimension of a repeating unit of the arrangement of interlaced sets of diffractive image segments. It will be appreciated that the repeat distance refers to the arrangement of interlacing, and that the grating regions themselves within different repeating units may differ.

Preferably, a maximum repeat distance of the arrangement of the interlacing is 100 microns, preferably 75 microns and more preferably 50 microns such that the repeat distance is not readily discernible by the naked human eye. The use of grating regions that are elongate along the first direction in the present invention advantageously allows a large number (e.g. at least 15) of diffractive image segments to be interlaced within a repeat distance that is not readily discernible by the naked human eye, without having an adverse effect on the saturation and brightness of the replayed colours as the number of grating elements arranged along the first direction can be optimised.

In embodiments, the sets of diffractive image segments are further interlaced along a further (preferably orthogonal) direction. For example, the diffractive image segments may be arranged in a grid pattern, such that the diffractive image segments of the two or more arrays are interlaced along two directions. Such interlacing of diffractive image segments in two (preferably orthogonal) directions advantageously allows the repeat distance orthogonal to the first direction to be further reduced.

Such interlacing of the diffractive image segments in two (preferably orthogonal) directions is particularly advantageous. The use of such a "grid" arrangement (where, for example, 20 diffractive image segments may be arranged in a 2×10 grid) beneficially allows an increased number of image frames to be replayed by the device dependent on viewing angle, with the repeat distance of the interlacing remaining below the resolution of the human eye. In the same manner as described above, the diffractive image segments need not be arranged in the same order of desired replay, and no overlying focussing element (e.g. lens) is required to replay the different image frames on tilting.

As we have discussed above, the present invention may make use of colour rendering, where grating regions corresponding to respective colour channels are arranged so as to cover a proportion of a diffractive pixel within an image element in order that the image element is perceived to exhibit a uniform colour. In particularly preferred embodiments, for at least one array (and typically all array(s)), at least one grating region covers a proportion of its respective diffractive pixel in accordance with a dithering arrangement. The use of dithering to provide the areal coverage advantageously prevents artefact large scale patterns (such as colour banding) being perceived by an observer of the device which might otherwise detract from the visual effect. The dithering arrangement is typically generated using a Stucki dithering algorithm, but other forms of dithering may be used such as Jarvis dithering, Floyd-Steinberg dithering, or half-tone.

As well as minimising large-scale "macro" patterns being perceived by an observer, the use of dithering advantageously provides good colour rendering and increases the size of the colour palette able to be exhibited by the device (i.e. increases the number of different colours that may be exhibited by the device) in the same way that dithering may be used to increase the number of apparent grayscale levels in images having only black and white pixels. This advantageously increases the security level of the device as it is more difficult to copy, and counterfeit devices are thus more easily detected.

Preferably, the dithering arrangement comprises an arrangement of a plurality of dithering elements within which no grating elements are present. The dithering elements can be thought of as "blank" elements which do not exhibit the colour of that diffractive pixel. Typically, each dithering element has a dimension in a cross direction orthogonal to the respective first direction of at least two times smaller than the dimension of the respective diffractive pixel along said cross direction. This ensures that the grating region of the respective diffractive pixel which is arranged in accordance with the dithering arrangement is considered to be a single grating region, or spectroscopic element, in the sense that the plurality of grating elements within that grating region cooperate to exhibit a combined visual effect (here a diffractive colour). The grating region maintains coherence across the partial interruption introduced by the dithering elements.

Since each dithering element has a dimension in a cross direction orthogonal to the respective first direction of at least two times smaller than the dimension of the respective diffractive pixel along said cross direction, the dithering arrangement has a higher resolution than the diffractive pixels. Advantageously, this means that the density of the dithering elements may vary within a diffractive pixel, with allows further control of the diffractive colours perceived when viewing the device, as compared to modulation of the areal coverage by changing the width of a grating region, for example.

In general, the grating regions may cover between 0% and 100% inclusive of a diffractive pixel. In other words, a diffractive pixel may be substantially completely covered by a grating region (i.e. 100% coverage), or a diffractive pixel may not comprise a grating region (i.e. 0% coverage). The dithering arrangement is used for diffractive pixels requiring greater than 0% and less than 100% coverage.

Typically, the pitch of the grating elements within each grating region of the device is less than 5 microns. More typically the pitch of the grating elements within each grating region is less than or equal to 3 microns. Preferably the pitch of the grating elements within each grating region is in the range of 0.6 microns to 1.5 microns.

In accordance with a second aspect of the invention there is provided an optical device that, upon illumination, exhibits one or more diffractive images dependent upon viewing angle, said optical device having a diffractive structure comprising a plurality of grating regions, each grating region corresponding to a component of a respective diffractive image; wherein each grating region comprises a plurality of grating elements arranged along a respective first direction such that each grating region, upon illumination, exhibits a diffractive colour such that the corresponding diffractive image is exhibited, and wherein, for at least one diffractive image: the grating regions are arranged in accordance with a plurality of diffractive pixels of the corresponding diffractive image, each diffractive pixel being assigned a uniform colour, and each grating region covers a proportion of a diffractive pixel corresponding to the proportion of the diffractive colour of the grating region to be exhibited by the diffractive pixel such that the corresponding diffractive image is exhibited; and wherein, at least one grating region covers the proportion of its respective diffractive pixel in accordance with a dithering arrangement.

The inventors have found that the use of dithering to modulate the relative proportions of the colours exhibited by the grating regions of the optical device provides improved colour rendering as compared to prior art devices. Without the use of dithering the abrupt boundary at the edge of the grating regions can lead to undesirable patterns being exhibited in the colour image, such as colour banding. The use of a dithering arrangement advantageously provides improved colour rendering as the apparent colour palette of the device increases, as has been described above. When the optical device is used as a security device, this beneficially increases the security level since counterfeit devices are easier to detect.

The dithering arrangement is typically generated using a Stucki dithering algorithm, but other forms of dithering may be used such as Jarvis dithering, Floyd-Steinberg dithering or half-tone.

Preferably, for at least one diffractive image (typically each diffractive image(s)); the diffractive pixels are arranged as an arrangement of image elements, wherein each image element comprises at least one diffractive pixel corresponding to a first colour channel and at least one diffractive pixel corresponding to a second colour channel; wherein, the diffractive structure comprises a plurality of first grating regions that upon illumination exhibit a diffractive colour corresponding to the first colour channel, and a plurality of second grating regions that upon illumination exhibit a diffractive colour corresponding to the second colour channel; wherein, at least one first grating region covers a proportion of a first diffractive pixel corresponding to the proportion of the first colour channel to be exhibited by the associated image element in accordance with a dithering arrangement, and at least one second grating region covers a proportion of a second diffractive pixel corresponding to the proportion of the second colour channel to be exhibited by the associated image element in accordance with a dithering arrangement, such that each image element exhibits its assigned uniform colour.

The dithering arrangement may be used for diffractive pixels requiring greater than 0% and less than 100% coverage.

The dithering arrangement preferably comprises a plurality of dithering elements within which no grating elements are present. The dithering elements can be thought of as "blank" elements which do not exhibit the colour of that diffractive pixel's colour channel. Preferably, each dithering element has a dimension in a cross direction orthogonal to the arrangement of grating elements of the respective diffractive pixel of at least two times smaller than the dimension of the respective diffractive pixel along said cross direction. Preferably, the density of the dithering elements varies within a diffractive pixel.

Preferably, the grating elements within each grating region have a constant pitch, substantially the same orientation, and a constant phase. In this manner, each grating region may be said to be "coherent", as described above in relation to the first aspect of the invention.

Preferably, each grating region comprises at least 20 grating elements arranged along the respective first direction, preferably at least 22 grating elements arranged along the respective first direction and even more preferably at least 26 grating elements arranged along the respective first direction.

In preferred embodiments, for at least one diffractive image (typically each diffractive image(s)), each image element further comprises at least one third diffractive pixel corresponding to a third colour channel; wherein the diffractive structure further comprises a plurality of third grating regions that upon illumination exhibit a diffractive colour corresponding to the third colour channel; wherein, at least one third grating region covers a proportion of a third diffractive pixel corresponding to the proportion of the third colour channel to be exhibited by the associated image element in accordance with a dithering arrangement such that the image element exhibits a uniform colour; preferably wherein the first, second and third colour channels correspond to red, green and blue colour channels.

The optical device of the second aspect may be adapted according to any of the features discussed in the first aspect of the invention. For example, the optical device may be configured to exhibit two or more diffractive images dependent on viewing angle, wherein the grating elements of the respective two or more diffractive images have different orientations within the plane of the device such that the said two or more diffractive images are exhibited at different viewing angles. The diffractive pixels of different diffractive images may be interlaced with each other.

In accordance with a third aspect of the invention there is provided a method of forming an optical device that, upon illumination, exhibits one or more diffractive images dependent on viewing angle, the method comprising: forming a diffractive structure in a carrier layer, said diffractive structure comprising a plurality of grating regions, each grating region corresponding to a component of a respective diffractive image, wherein: each grating region of the diffractive structure comprises a plurality of grating elements arranged along a respective first direction, each grating element having a principal component of orientation within the plane of the device that is substantially orthogonal to said respective first direction; wherein, the grating elements within each grating region have a constant pitch and substantially the same orientation such that each grating region, upon illumination, exhibits a diffractive colour such that the corresponding diffractive image is exhibited; wherein, the diffractive structure comprises first and second grating regions that are both elongate along a common first direction, said first and second grating regions being adjacent along said common first direction, and wherein the pitch and/or orientation of the grating elements of the first and second grating regions are different.

The resulting device provides all the benefits already discussed above with reference to the first aspect of the invention.

The diffractive structure is typically formed in accordance with a template defining a plurality of diffractive pixels of the one or more diffractive images to be exhibited by the device. The one or more diffractive images exhibited by the optical device are typically based on corresponding one or more source images.

The template may be generated prior to performing the steps of the method. In other embodiments, the method may further comprise the steps of generating the template by, for each of the one or more diffractive images: providing an arrangement of grid pixels; providing a source colour image comprising a plurality of image pixels, each image pixel being assigned a colour; based on the plurality of image pixels of the source image, generating a mask defining masked regions and non-masked regions of the grid pixels, wherein the non-masked regions define proportions of the grid pixels required to generate a version of the source image; and applying the mask to the arrangement of grid pixels so as to generate the template. The grating regions of the device are then formed in accordance with the non-masked regions of the template. Typically these steps will be performed using one or more appropriately programmed processors.

The template may be considered to be comprised of a plurality of template pixels, with each template pixel being the combination of a grid pixel with the region of the mask overlying that grid pixel.

The arrangement of grid pixels may correspond to the plurality of image pixels of the source image, with the pitches of the resulting grating regions corresponding to the assigned colours of the image pixels. Each different image pixel colour will require a grating region of different pitch. For example, an image pixel assigned a "pink" colour will map to a grating region in the device having a pitch such that at the preferred tilt angle that grating region will exhibit a pink colour upon illumination. However, such embodiments are computationally expensive.

Thus, typically the invention may make use of colour rendering. In such embodiments the arrangement of grid pixels may comprise first grid pixels corresponding to a first colour channel and second grid pixels corresponding to a second colour channel. Particularly preferably, the arrangement of grid pixels further comprises third grid pixels corresponding to a third colour channel. The arrangement of grid pixels is typically in a repeating pattern and may be seen to define a plurality of image elements each containing a repeating pattern of grid pixels, wherein the colour channel contributions of the grid pixels within an image element combine such that the image element is perceived to exhibit a uniform colour across its domain. The arrangement of grid pixels may be provided independently of any source image, with the dimensions of the grid pixels corresponding to the desired size of the diffractive pixels of the optical device. For example, each grid pixel may be chosen to have a maximum dimension along the respective first direction of 60 microns, preferably 50 microns and more preferably 35 microns; and a dimension orthogonal to the respective first direction of between 2 microns and 30 microns, preferably between 5 microns and 12 microns. The arrangement of grid pixels may be based on the source image. For example, a grid pixel may have a size that is a multiple of the size of the image pixels of the source image (e.g. the size of a grid pixel may correspond to the size of an m×n array of image pixels of the source image). Preferably, at least one grid pixel (preferably all grid pixels) is elongate (easily allowing for corresponding elongate grating regions), with the advantages as described above in relation to the first aspect of the invention.

The source colour image that is provided could already be formed as an array of image pixels of the desired size. However, in other cases the method may include an additional step of creating this version of the source image from some original input image. This could for example be a bitmap, jpeg or any other image format and may already be formed of pixel-type elements although these may not be of the desired resolution. Typically, the source image will be of a higher resolution than the resolution of the arrangement of grid pixels. In other words, the image pixels of the source image are smaller than the size of the grid pixels, typically at least two times smaller as this is advantageous for embodiments where the mask is in the form of a dithering arrangement, as discussed below. Preferably, the resolution of the source image is at least 3600 dpi.

The mask may have an arrangement such that the non-masked areas have an elongate (e.g. rectangular) geometry, with the proportions of the grid pixels defined by modulating the width of the non-masked areas. Consequently, the grating regions of the optical device have a corresponding elongate geometry, with the advantages discussed above.

In other embodiments, for at least one diffractive image, the mask may be in the form of a dithering arrangement comprising a plurality of dithering elements, wherein each dithering element has a dimension in a cross direction orthogonal to the respective first direction of at least two times smaller than the dimension of the respective grid pixel along said cross direction. Such a dithering mask is typically generated using a Stucki dithering algorithm, but other forms of dithering may be used such as Jarvis dithering, Floyd-Steinberg dithering or half-tone. As discussed above, this relationship between the size of the dithering elements and the grid pixels may be arrived at by sampling the original image at a resolution at least twice that of the arrangement of grid pixels. The density of the dithering elements may vary within a grid pixel.

In embodiments where colour rendering is used, the mask may be generated in a number of ways. Firstly, the arrangement of grid pixels may be independent of the source image, and the colours of the image pixels of the (higher resolution) source image used to generate the mask so that the contributions of the unmasked areas of the template, in combination, exhibit a version of the source image.

Secondly, the colours in the source image may be approximated to a set of N colours, with these N colours associated with a set of N arrangements of the grid pixels (e.g. colour channels of image elements) and their relative proportions that in combination will generate the identified colour. These N arrangements may be stored in a look-up table. Hence, prior to performing the method, the look-up table must be populated with a set of possible colours for the image pixels and a corresponding arrangement of grid pixels for each one. In this case there will be a finite number of possible colours stored and so in practice it will be necessary to approximate the identified colour to the closest available colour in the look-up table. This could be done for example by associating each colour in the look-up table with a range of colour values (preferably centred on the stored colour itself) and then selecting which of the stored colours (and hence template arrangements) should be used for any one image pixel by selecting the stored colour having a colour range into which the identified colour of the image pixel falls.

In a third method, the mask may be created by identifying a colour of the source colour image, identifying what relative proportions of the grid pixels are required to generate the identified colour, and using an algorithm to generate the relative proportions of the grid pixels which will in combination generate the identified colour. This approach has the advantage that there is no limit placed on the number of different colours which can be represented in the template image. However, it is also more computationally expensive.

In accordance with a fourth aspect of the invention, there is provided a method of forming an optical device that, upon illumination, exhibits one or more diffractive images dependent on viewing angle, the method comprising: forming a diffractive structure in a carrier layer, said diffractive structure comprising a plurality of grating regions, each grating region corresponding to a component of a respective diffractive image; wherein each grating region comprises a plurality of grating elements arranged along a respective first direction such that each grating region, upon illumination, exhibits a diffractive colour such that the corresponding diffractive image is exhibited, and wherein, for at least one diffractive image: the grating regions are arranged in accordance with a plurality of diffractive pixels of the corresponding diffractive image, each diffractive pixel being assigned a colour, and each grating region covers a proportion of a diffractive pixel corresponding to the proportion of the diffractive colour of the grating region to be exhibited by the diffractive pixel such that the corresponding diffractive image is exhibited; and wherein, at least one grating region covers the proportion of its respective diffractive pixel in accordance with a dithering arrangement.

A device formed by such a method provides all of the advantages set out in the second aspect of the invention.

The diffractive structure may be formed in accordance with a template defining a plurality of diffractive pixels of the one or more diffractive images to be exhibited by the device.

The template may be formed prior to the steps of the method. In other embodiments, the method may further comprise generating the template by, for each of the one or more diffractive images: providing an arrangement of grid pixels; providing a source colour image comprising a plurality of image pixels, each image pixel being assigned a colour; based on the plurality of image pixels of the source image, generating a mask defining masked regions and non-masked regions of the grid pixels, wherein the non-masked regions define proportions of the grid pixels required to generate a version of the source image; and applying the mask to the arrangement of grid pixels so as to generate the template.

Typically, the arrangement of grid pixels comprises first grid pixels corresponding to a first colour channel and second grid pixels corresponding to a second colour channel, and wherein preferably the arrangement of grid pixels further comprises third grid pixels corresponding to a third colour channel, said first, second and third colour channels correspond to red, green and blue colour channels. Thus, preferably the template makes use of first, second and third colour channels in order to allow for R,G,B colour rendering.

The dithering arrangement preferably comprises a plurality of dithering elements within which no grating elements are present, preferably wherein the density of the dithering elements varies within a diffractive pixel. Each dithering element typically has a dimension in a cross direction orthogonal to the arrangement of grating elements of the respective diffractive pixel of at least two times smaller than the dimension of the respective diffractive pixel along said cross direction.

The dithering arrangement is typically generated using a Stucki dithering algorithm, but other forms of dithering may be used such as Jarvis dithering, Floyd-Steinberg dithering or half-tone. The dithering arrangement may be used for diffractive pixels requiring greater than 0% and less than 100% coverage.

Preferably, the grating elements within each grating region have a constant pitch, substantially the same orientation, and a constant phase. In this manner, each grating region may be said to be "coherent", as described above in relation to the first aspect of the invention.

Preferably, each grating region comprises at least 20 grating elements arranged along the respective first direction, preferably at least 22 grating elements arranged along the respective first direction and even more preferably at least 26 grating elements arranged along the respective first direction.

The method of the fourth aspect may be adapted according to any of the features discussed in the third aspect of the invention.

The diffractive structure of the invention may be formed using a variety of methods to write the desired structure into a layer of resist material. Preferably, the diffractive structure is formed using maskless lithography. Examples of maskless lithography techniques include electron beam lithography and direct laser writing. With electron beam lithography, pitches of the grating elements less than 0.5 microns are achievable. However, the diffractive structure may be formed using other techniques such as optical lithography, contact mask based interferential lithography and contact mask based lithography (non-interferometric). Particularly preferably, the diffractive structure is formed in a manner such that the grating elements within each grating region have a constant pitch, substantially the same orientation and constant phase (i.e. are coherent). This is typically ensured by writing each grating region in a single pass. Typically the diffractive structure is in the form of a surface relief.

Particularly preferably, the optical device according to the first or second aspect, or made in accordance with the method of the third or fourth aspect, is a security device. In other words, the security device may be used to prevent copying or counterfeiting of an article or document to which it is applied. Typically, a "security device" is not possible to reproduce accurately by taking a visible light copy, e.g. through the use of standardly available photocopying or scanning equipment.

In accordance with a further aspect of the invention there is provided a security article comprising a security device as described above, wherein the security article is preferably formed as a security thread, strip, foil, insert, label, patch, or a substrate for a security document.

In accordance with a further aspect of the invention there is provided a security document comprising a security device or security article as already described, the security document preferably comprising a banknote, cheque, passport, identity card, certificate of authenticity, fiscal stamp or another document for securing value or personal identity. Typically, the security document comprises a substrate with a transparent window portion and the security device or security article is located at least partially within the transparent window portion.

In accordance with a yet further aspect of the invention there is provided a method of manufacturing a security document, comprising: providing (e.g. manufacturing) a security device as discussed above, and; integrating the security device into a security document, wherein preferably the security document is formed as a banknote, cheque, passport, identity card, certificate of authenticity, fiscal stamp or another document for securing value or personal identity.

BRIEF DESCRIPTION OF THE DRAWINGS

Embodiments of the invention will now be described with reference to the attached figures, in which:

FIG. 1(*a*) is a perspective view of a security document comprising an optical device according to the invention;

FIG. 1(*b*) is a plan view of a security document comprising an optical device according to the invention;

FIG. 11 schematically illustrates a further embodiment of the invention;

DETAILED DESCRIPTION

Figure 2A:
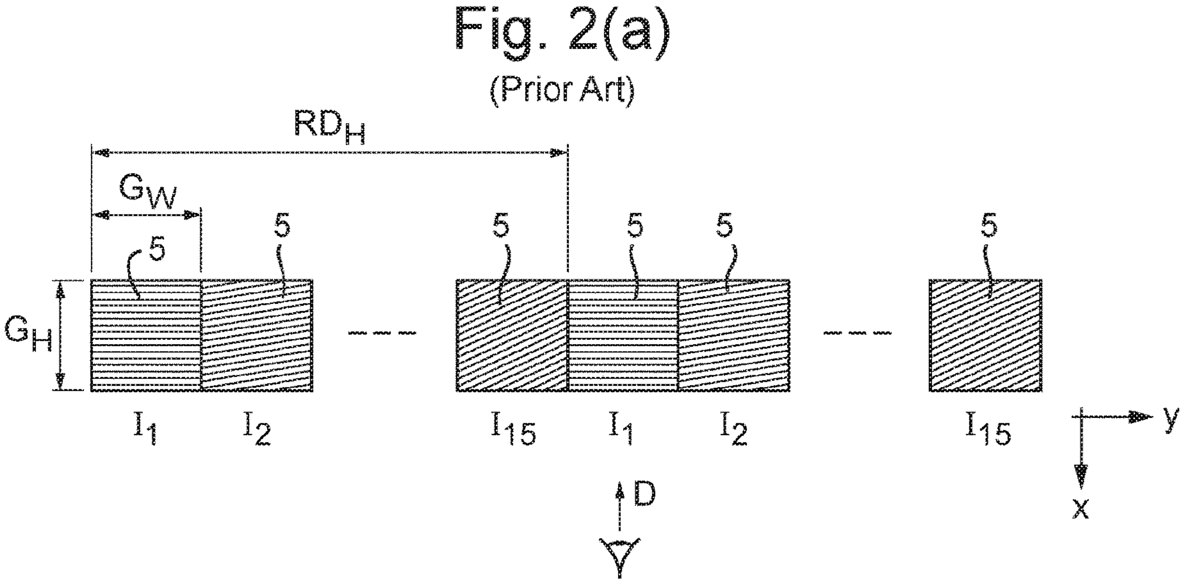
FIGS. 2(*a*) and 2(*b*) are schematic plan views of arrangements of grating regions that illustrate the concept of the invention.

As has been described above, grating regions of the diffractive structure according to the invention may have various different forms (e.g. amplitude- or phase-based). The following description will focus on diffractive structures formed as a surface relief (i.e. phase-difference devices rather than amplitude-difference devices) since these lend themselves well to large volume replication. Throughout the figures, the lines used to illustrate individual grating elements are schematic and do not necessarily indicate the exact number of grating elements within a grating region. The lines used to illustrate the individual grating elements represent the maximum heights, or “peaks”, of the surface relief.

Figures 1A, 1B:
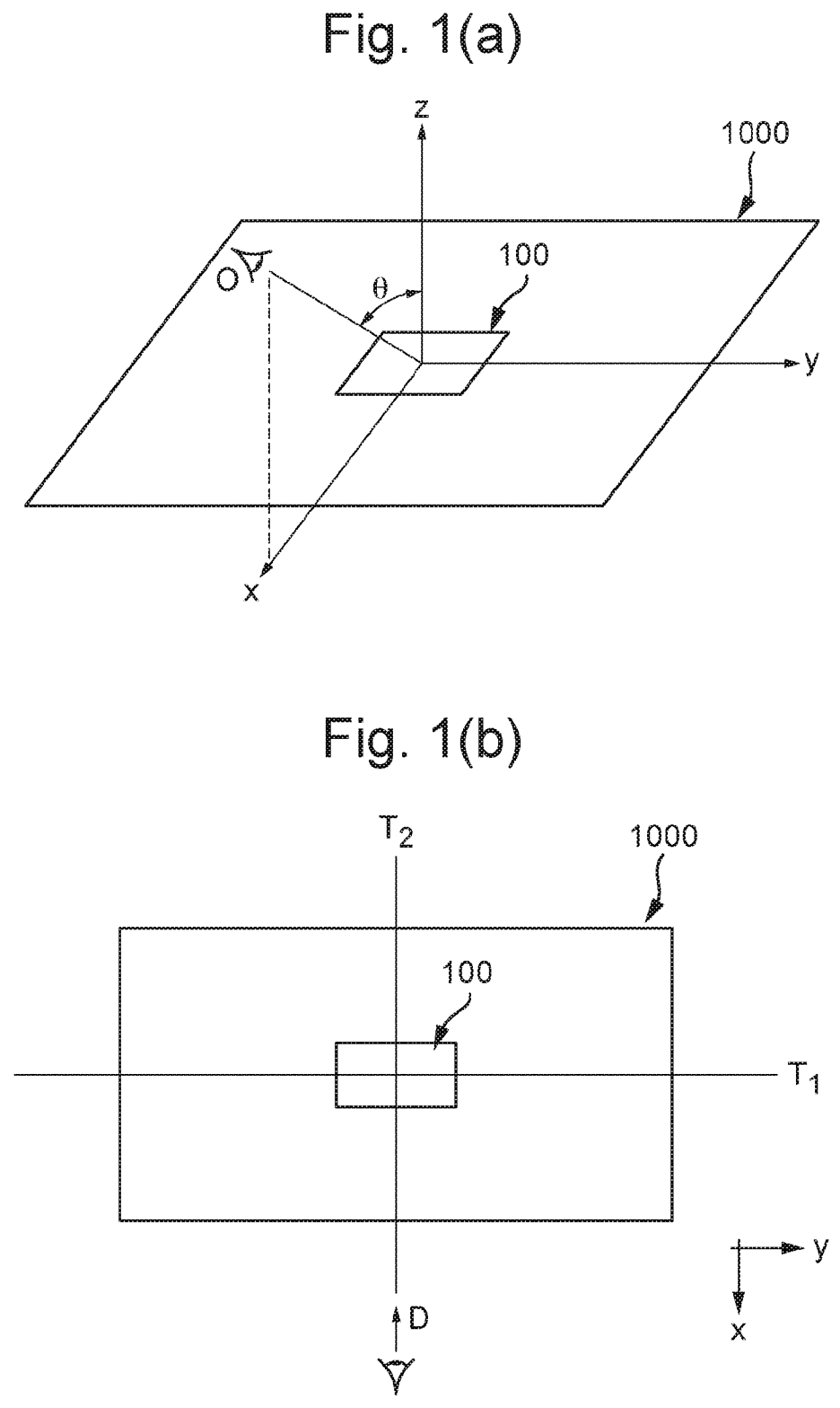

FIG. 1(*a*) is a perspective view of a security document 1000 (here in the form of a banknote) comprising an optical device 100 according to the present invention. Here, the optical device 100 is used to help prevent forgery, copying or counterfeiting of the banknote, and is therefore a security device. The security device 100 comprises a diffractive structure comprising a plurality of grating regions, with each grating region corresponding to a component of a diffractive image that is exhibited by the device. The device may be arranged to exhibit a single colour image or a plurality of images (“frames” of a variable image) that are selectively exhibited as the device is tilted.

FIG. 1(*a*) also schematically shows an observer O viewing the security device 100 on the banknote 1000 at a tilt angle θ which may be typically varied by tilting the banknote 1000 (and thus the device 100) about a tilt axis T1 lying in the plane of the banknote and aligned along the y axis (see FIG. 1(*b*)), i.e. perpendicular to the direction of viewing, D.

As also illustrated in FIG. 1(*b*), the banknote 1000 may be tilted about a tilt axis T2 lying substantially within the plane of the banknote and substantially parallel with the x axis (i.e. parallel to the viewing direction D) in order to vary a second tilt angle φ. In general, a viewing angle of the observer O with respect to the banknote 1000 can be described as a combination of a first tilt angle θ and a second tilt angle φ. In the view of FIG. 1(*a*), the banknote 1000 lies within the x-y plane and thus the second tilt angle φ is 0 degrees.

Within the geometry of FIGS. 1(*a*) and 1(*b*), the device 100 is intended to be viewed along a first viewing direction D within the x-z plane (referred to hereafter as the “principal plane of dispersion”) as the banknote is tilted about the tilt axes T1 and T2. The first viewing direction is along the x-axis in the geometry of FIGS. 1(*a*) and 1(*b*).

Within the geometry of FIGS. 1(*a*) and 1(*b*), each grating element of the diffractive structure has a principal component of orientation within the plane of the device 100 substantially orthogonal to the x axis. In other words, each grating element of the diffractive structure has a grating vector with a principal component of orientation along the first viewing direction D such that the principal plane of dispersion of the diffractive structure lies within the x-z plane.

The principal plane of dispersion remains constant as the banknote 1000 is tilted relative to the observer O, and intersects the device 100 along a direction parallel with the x-axis.

For ease of description, in the following figures the banknote 1000—and hence the security device 100—is illustrated lying within the x-y plane (i.e. the second tilt angle φ is 0 degrees).

Figure 2B:
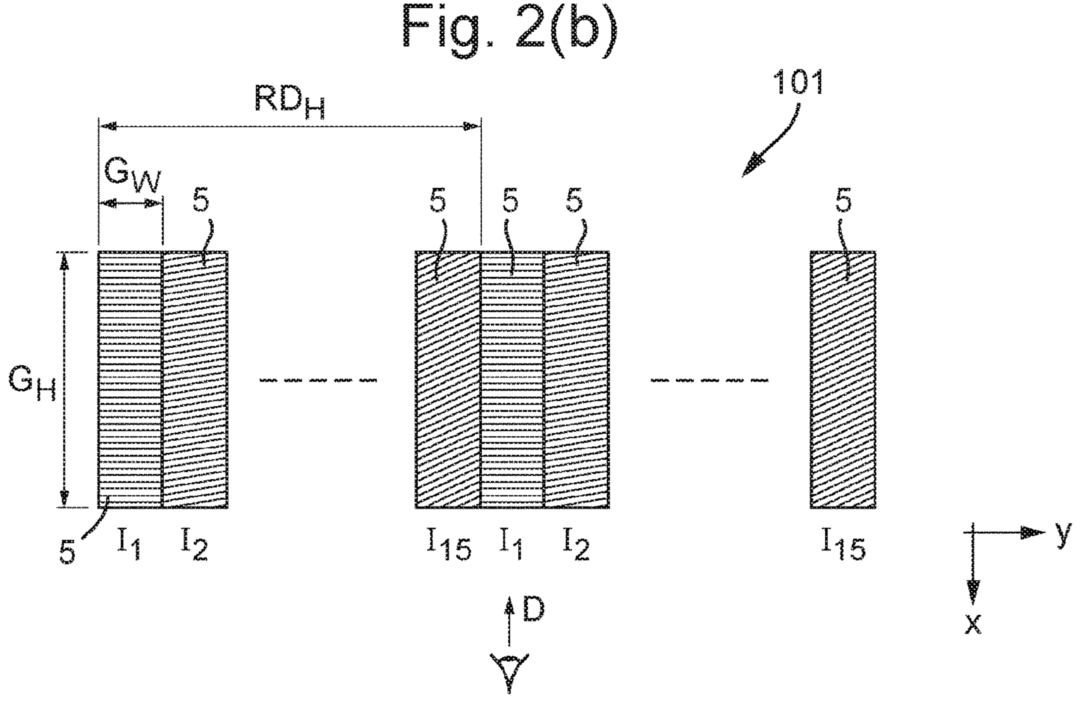

FIGS. 2(*a*) and 2(*b*) outline the general concept of the invention. FIG. 2(*a*) illustrates a schematic plan view of an arrangement of grating regions 5 within a prior art device that is designed to exhibit a plurality of image frames at different viewing angles. Here the device exhibits 15 images $I_1, I_2 \ldots I_{15}$ with the grating regions of each frame being interlaced along a direction perpendicular to the viewing direction (i.e. interlaced along the y-axis). The grating elements of different frames have different orientations within the plane of the device such that the different frames are exhibited at different viewing angles upon tilting the device about tilt axis T2.

The grating regions 5 in FIGS. 2(*a*) and 2(*b*) each correspond to a component (e.g. colour component) of the respective image.

In conventional devices such as schematically illustrated in FIG. 2(*a*), the grating regions have a square geometry, such that the width of a grating region $G_W$ is equal to its length $G_H$. As the number of frames exhibited by the device increases, so does the repeat distance of the interlacing, here denoted by $RD_H$. This repeat distance $RD_H$ is desired to be kept smaller than 100 microns such that the interlacing structure is not visible and obvious to the naked human eye at typical viewing distances of the device of approximately 25 cm to 30 cm.

Thus, using these square grating regions, in order to reduce the repeat distance $RD_H$ to ~100 microns, the width and length of the grating regions are each reduced to ~7 microns. Taking an example grating element pitch of 0.9 microns (exhibiting a green colour at a first tilt angle θ of approximately 40 degrees), this means that each grating region only contains 7 grating elements arranged along the viewing direction D.

As has been discussed above in the summary of the invention, the resolving power of a grating region is dependent on the number of coherent grating elements within that grating region aligned along the direction of its grating vector k. In order for transition colours within the visible spectrum to be resolved by the human eye, we choose a Δλ of 25 nm, which requires a minimum of 20 grating elements within a grating region. We also saw in the summary of the invention that the brightness of an exhibited diffractive colour is proportional to the square of the number of grating elements within a grating region. In the prior art device, Δλ=79 nm at 550 nm (i.e. greater than 25 nm) and thus the exhibited colours have low colour saturation.

FIG. 2(*b*) schematically illustrates a plan view of a part of a diffractive structure 101 of a device according to the invention. Similarly to the prior art device described above with reference to FIG. 2(*a*), the device exhibits 15 frames $I_1$, $I_2$ . . . $I_{15}$ upon tilting about tilt axis T2, with the grating regions of each frame being interlaced along a direction perpendicular to the viewing direction D (i.e. interlaced along the y axis). Again, the grating elements of different frames have different orientations within the plane of the device such that the different frames are exhibited at different viewing angles. It will be appreciated that the diffractive structure 101 will extend in both the x and y dimensions.

Here, each grating region 5 is elongate along the viewing direction D (i.e. x-axis) such that $G_H > G_W$. Typically the ratio of elongation (i.e. $G_H:G_W$) is at least 2:1 and is preferably 5:1 or greater. The elongation of the grating regions along the viewing direction advantageously allows each grating region to accommodate enough grating elements to maintain good saturation and brightness of the exhibited colours, whilst keeping the horizontal repeat distance RDH below 100 microns such that the interlacing structure is not visible and obvious to the naked human eye.

For example, in FIG. 2(*b*) the width of the grating regions GW may be chosen to be 7 microns (as in FIG. 2(*a*)) in order to reduce the horizontal repeat distance to a dimension that is not easily perceivable by the naked human eye. However, in this example the length GH of the grating regions is chosen to be 35 microns such that, for a grating element pitch of 0.9 microns, N=39, giving rise to dramatically improved saturation and brightness of the exhibited diffractive colours in the frames of the variable image as compared to the prior art devices.

As explained above, each image frame of the multiplexed image is viewable at an angle of tilt φ of the banknote 1000 about the tilt axis T2. This is due to the fact that the grating elements of the different image frames have different orientations (azimuthal angles) within the plane of the device. However, the grating elements of an individual frame all have substantially the same orientation such that at a particular angle of tilt about tilt axis T2, the observer will perceive the corresponding image frame composed of its constituent grating regions. In other words, each grating element within the grating regions forming image $I_1$ will have substantially the same orientation, and each grating element within the grating regions forming image $I_2$ will have substantially the same orientation, which is different to the orientation of the grating elements of image $I_1$ and so on for each image. In this way, a set of grating regions corresponding to an image frame may be referred to as a viewing channel This variation in grating element orientation is shown in more detail in FIG. 3, which schematically illustrates a grating region 5*a* from image frame $I_1$, and a grating region 5*b* from diffractive image frame $I_2$. The grating elements of these grating regions are also schematically shown.

As can be seen, the grating elements of grating region 5*a* have a grating vector k1 aligned with the x axis (i.e. along the viewing direction D), and the grating elements of grating region 5*b* have a grating vector k2 oriented at an azimuthal angle α with respect to the x axis. The plane of dispersion of a grating region, which is the plane within which white light is split into its constituent parts due to diffraction, intersects the plane of the device 100 along the direction of its grating vector.

Thus, as grating vector k1 is aligned with the x axis, an observer viewing the device 100 along the x-axis will perceive image frame $I_1$ when the device lies within the x-y plane as illustrated in FIG. 1(*a*) (i.e. no tilt about tilt axis T2), as the plane of dispersion for the grating regions of image frame $I_1$ aligns with the principal plane of dispersion. However, as the banknote 1000 is tilted about tilt axis T2 out of the x-y plane (i.e. changing tilt angle φ), the viewer will perceive different frames of the variable image as their planes of dispersion intersect with the principle plane of dispersion within which the viewer views the device.

Although under illumination by collimated light each image frame would replay at different discrete angles of tilt about tilt axis T2, in typical ambient lighting conditions which is highly diffuse, at particular angles of tilt φ about tilt axis T2, typically more than one image frame will be visible to a certain degree.

Figure 3:
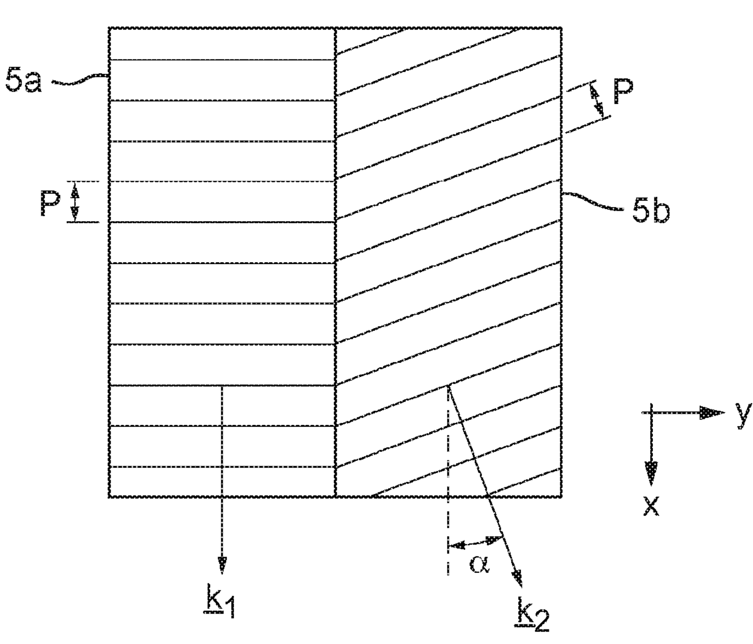
FIG. 3 illustrates the variation in grating element orientation according to an embodiment of the invention.

As can be seen in FIG. 3, the projection of the pitch, P, of the grating elements on to the principal plane of dispersion is given by P cos α. This projection defines the colour exhibited by that grating region when the device is viewed within the principal plane of dispersion. The azimuthal angles α of the grating elements across the plurality of image frames typically vary between approximately −10 degrees and +10 degrees inclusive, such that the difference in the pitch projections onto the principal plane of dispersion (and hence any difference in colour between frames) is negligible.

Therefore, in preferred embodiments, the pitch of the grating elements corresponding to a particular colour in different diffractive image frames is the same. For example, in FIG. 3, each grating region 5*a*, 5*b* may exhibit a red colour, and the pitch P along their respective grating vectors k1, k2 is the same. However, in alternative embodiments, the pitches of the grating elements may vary between diffractive image frames dependent on their azimuthal orientation a such that the spacing of the grating elements along the intended viewing direction (i.e. the x-axis) is kept constant across the device for a particular colour.

In FIG. 2(*b*), the grating regions 5 of the diffractive structure 101 are arranged in sequential order, i.e. $I_1$, $I_2$ . . . $I_{15}$ from left to right along the y-axis. The grating element orientation between the image frames will vary in a corresponding manner such that upon tilting the device about tilt axis T2, the image frames $I_1$, $I_2$ . . . $I_{15}$ are sequentially replayed. However, it will be appreciated that the grating regions of the different image frames do not necessarily need to be arranged in sequential order, so long as the orientation of the grating elements within the grating regions are such that the corresponding image frames are sequentially replayed (or replayed in the desired order) upon tilting the device.

Figure 4:
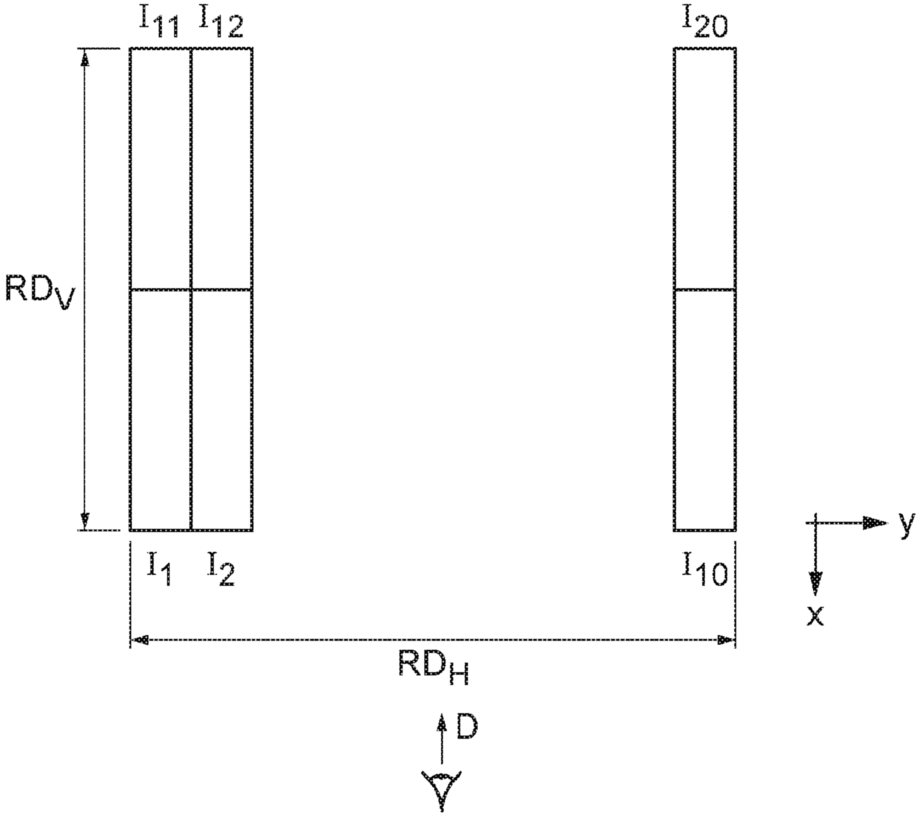
FIG. 4 schematically illustrates an arrangement of grating region interlacing according to an embodiment of the invention.

The horizontal repeat distance of the interlacing within a diffractive structure 101 may be further reduced by "stacking" the grating regions along the direction of elongation (i.e. along the viewing direction). FIG. 4 schematically illustrates how 20 grating regions corresponding to respective image frames may be arranged in two rows of ten, thereby reducing the repeat distance in the horizontal direction ($RD_H$) even further. Again using grating regions of dimension 35 microns×7 microns, we have an $RD_H$ of 70 microns and a vertical repeat distance $RD_V$ of 70 microns (neither of which are readily discernible to the naked human eye), whilst maintaining the good colour saturation and brightness. The grating regions are elongate along a common direction (here along the x axis) and grating regions that are adjacent along the common direction have grating elements of different orientation such that the image frames are sequentially replayed on tilting the device. For example, the adjacent grating regions of image frames I1 and I11 will have different grating element orientations as they correspond to components of different image frames. The adjacent grating regions may also have grating elements of different pitch (i.e. exhibit different spectral colours).

The grating regions of image frames I1 and I11 are adjacent along their common direction of elongation. In other words, the "short" edges of the grating regions I1 and I11 are adjacent each other. Similarly, the grating regions of image frames I2 and I12 are adjacent along their common direction of elongation, as are the grating regions of image frames I10 and I20.

Again, the grating regions do not need to be arranged sequentially within the diffractive structure, so long as the grating element orientations are such that each diffractive image segment is sequentially replayed (or replayed in the desired order) upon tilting the device about tilt axis T2.

The diffractive structure is divided into a plurality of diffractive pixels, with each grating element being associated with a diffractive pixel such that the grating regions are arranged in accordance with the plurality of diffractive pixels. Each diffractive pixel is assigned a colour, for example a colour as sampled from an original source image that the optical device is configured to exhibit.

In embodiments, each grating region may define a diffractive pixel; in other words each grating region typically has the same dimensions (e.g. length, width) as its associated diffractive pixel. In such embodiments, each diffractive pixel may map on to an image pixel of a source image which has been assigned a colour. The pitch of the grating region of the corresponding diffractive pixel may then be controlled such that the diffractive pixel exhibits that assigned colour at the desired tilt angle θ (typically ~40 degrees. However, this approach is computationally expensive since the number of colours (and therefore grating regions of different pitch) required to exhibit the source image is extensive. Therefore, in preferred embodiments, colour rendering using grating regions corresponding to a limited number of (typically R,G,B) colour channels may be used to exhibit the desired colours of the diffractive image, as will now be explained.

Figure 5:
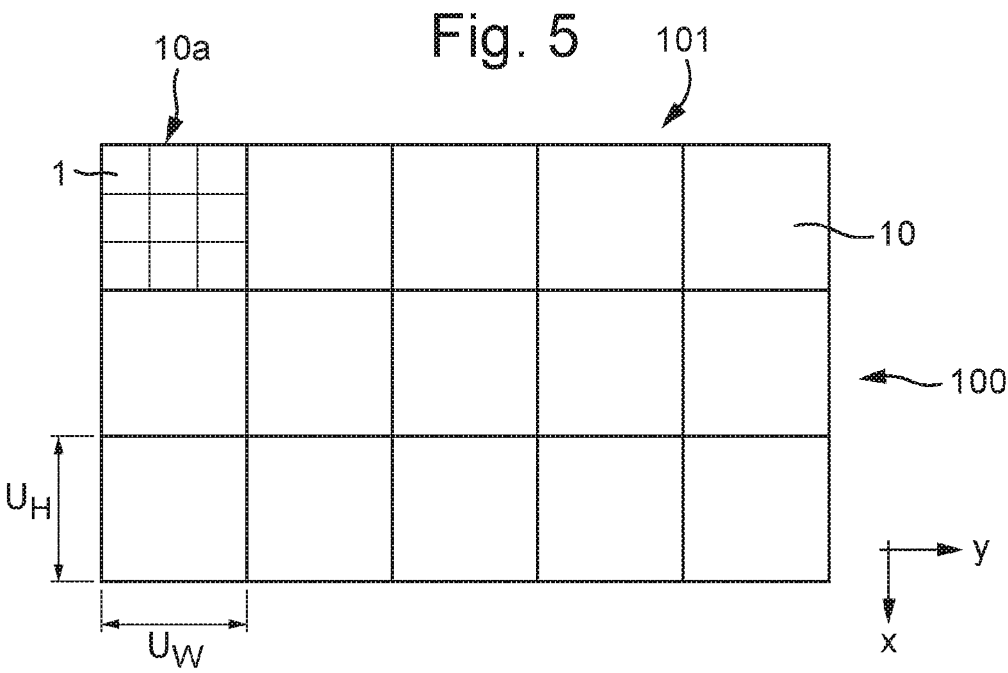
FIG. 5 is a schematic plan view of an array of an array of diffractive pixels of a device according to an embodiment of the invention.

FIG. 5 is a schematic plan view of an array 101 of diffractive pixels 1 of a diffractive structure 100 which utilises colour rendering, according to an example of the invention. Here, the diffractive pixels 1 are arranged as a repeating arrangement of image elements 10. For simplicity, the diffractive pixels 1 are only illustrated in one image element (labelled 10*a*) in FIG. 5. The colour contributions of the diffractive pixels within an image element combine such that that image element is perceived by the human eye to exhibit an assigned uniform colour across its domain. This assigned uniform colour may correspond to a determined uniform colour of a corresponding image element of a source image P, for example.

As schematically represented at image element 10*a*, each image element comprises a plurality of diffractive pixels 1. Each diffractive pixel 1 corresponds to a colour channel that is used for colour rendering such that each image element 10 of the array exhibits the assigned uniform colour. In this example, the security device 100 makes use of red green blue (RGB) colour rendering. However, it will be appreciated that colour rendering techniques other than RGB may be used, for example CMYK rendering or two channel rendering may be used.

The total area dedicated to each colour channel within an image element is substantially the same. In other words, the total area dedicated to the red colour channel is equal to the total area dedicated to the green colour channel which in turn is equal to the total area dedicated to the blue colour channel. Thus, preferably, each diffractive pixel 1 within an image element 10 has substantially the same dimensions, and there is the same number of diffractive pixels of each colour channel within each image element. Other arrangements of diffractive pixels within an image element such that the total area per colour channel is the same are envisaged, however.

The image elements 10 should preferably be sufficiently small that the naked human eye sees a substantially continuous image when viewing the device, and not the individual image elements. Typically each image element has a dimension less than 100 microns. For the purposes of this example, each image element 10 has square geometry with a dimension in both the x and y dimensions of 72 microns.

Figure 6:
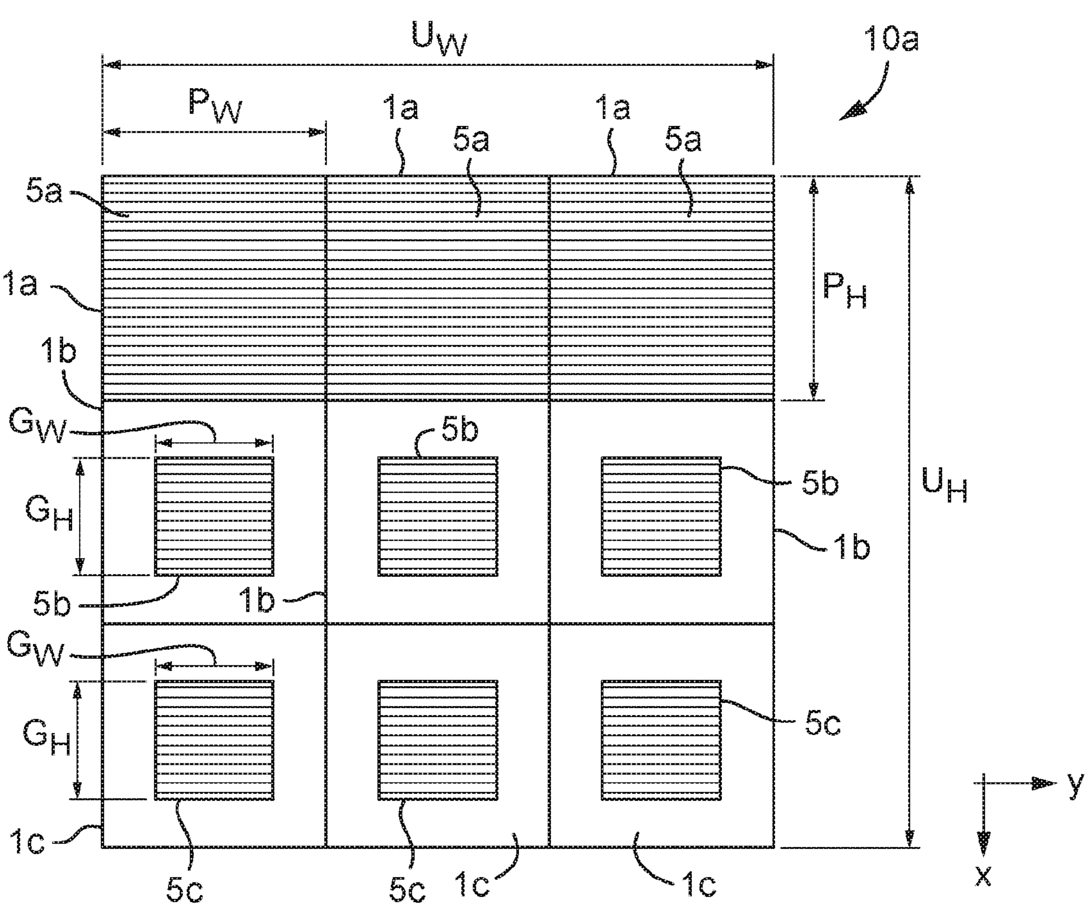
FIG. 6 is a magnified view of an image element of a prior art optical device.

FIG. 6 is a magnified view of an image element 10*a*, and schematically illustrates a prior art device that uses conventional methods for colour rendering such that each image element 10 exhibits the assigned uniform colour (e.g. of a corresponding image pixel).

Image element 10*a* comprises diffractive pixels 1(*a*), 1(*b*), and 1*c*. In more detail, first diffractive pixels 1(*a*) correspond to the red colour channel, second diffractive pixels 1(*b*) correspond to the blue colour channel, and third diffractive pixels 1*c* correspond to the green colour channel. The diffractive structure of the optical device 100 comprises a plurality of grating regions 5, and the proportional coverage of each diffractive pixel 1 by its respective grating region 5 determines the perceived colour exhibited by the image element 10*a* upon illumination. The area of a diffractive pixel covered by its respective grating region varies between 0% and 100% inclusive. In this example, image element 10*a* is assigned a red-pink colour, which, using 8-bit notation requires an RGB value of (255, 128, 128). In other words, the "red" diffractive pixels 1(*a*) corresponding to the red colour channel should be fully (i.e. 100%) covered by their respective regions 5*a*; the "green" diffractive pixels 1(*b*) corresponding to the green colour channel should have 50% coverage by their respective grating regions 5*b*, and the "blue" diffractive pixels 1*c* corresponding to the blue colour channel should have 50% coverage by their respective grating regions.

Each grating region 5 comprises a plurality of grating elements having a pitch P, and is configured to exhibit the colour of its associated colour channel (i.e. red, green or blue) at a particular first tilt angle θ within the principal plane of dispersion. The pitches of each grating region are such that the RGB colours are exhibited at substantially the same first tilt angle θ in order that the correctly rendered colour image is exhibited at that tilt angle.

For a typical tilt angle θ of ~40 degrees, assuming first order diffraction (m=1), and, for simplicity, assuming that white light is incident upon the device along the device normal, using Equation 2:

$$P \sin \theta = m\lambda,$$

we can see that the "red" grating regions (λ~650 nm) require a pitch P~ 1.0 microns; the "green" grating regions (λ~550 nm) require a pitch P~0.9 microns; and the "blue" grating regions (λ~480 nm) require a pitch P~0.7 microns. The skilled person will appreciate that the diffraction grating equation may be used to determine the pitch P of grating regions required for varying desired tilt angles θ.

In this example, as can be seen from FIG. 6, each grating element is aligned substantially orthogonal to the x axis and thus has a grating vector k aligned with the x axis (viewing direction D). Consequently, the grating regions diffract light within the principle plane of dispersion (i.e. the x-z plane).

In the prior art device of FIG. 6, the geometry of each grating region 5 is maintained as a square (in line with the geometry of the diffractive pixels), and the dimensions of the grating regions are modulated to cover the desired areas of the diffractive pixels in order that the image element exhibit the assigned colours. This is clearly seen in the "green" and "blue" diffractive pixels 1(*b*), 1*c*, where the corresponding "green" and "blue" grating regions 5*b*, 5*c* have square geometry and cover 50% of the area of their respective diffractive pixels.

However, this poses a problem when the image element dimensions (and therefore the diffractive pixel dimensions) are reduced, for example to provide increased resolution images, smaller images, or variable multiplexed images as described above. In this example, each image element 10 has a length along the x axis, $U_H$, of 72 microns and a width along the y axis, $U_W$, of 72 microns. Each diffractive pixel has a width $P_W$ of 24 microns, and a length $P_H$ of 24 microns. With similar notation, we use $G_W$ to represent the width of a grating region, and $G_H$ to represent the length of a grating region.

As we can immediately see from FIG. 6, as the "green" grating regions 5*b* in the "green" diffractive pixels 1(*b*) have been reduced in area in order to provide the required 50% area coverage, $G_H$=S$P_H$/SQRT(2)~17 microns. With a pitch P of 0.9 microns, the number of grating elements within the "green" grating regions 5*b* aligned along the intersection of the principal plane of dispersion with the device (i.e. the x-axis) is 18, meaning that Δλ>25 nm (i.e. reduced resolving power). Consequently, the colour image exhibited by the prior art device has reduced colour saturation and brightness, which is detrimental to the image quality and hence security level.

It will be appreciated that the worked example in FIG. 6 is exemplary only, and this problem of reduced resolving power (and hence colour saturation) and colour brightness is only exacerbated as the image element and diffractive pixel sizes are reduced.

Figure 7:
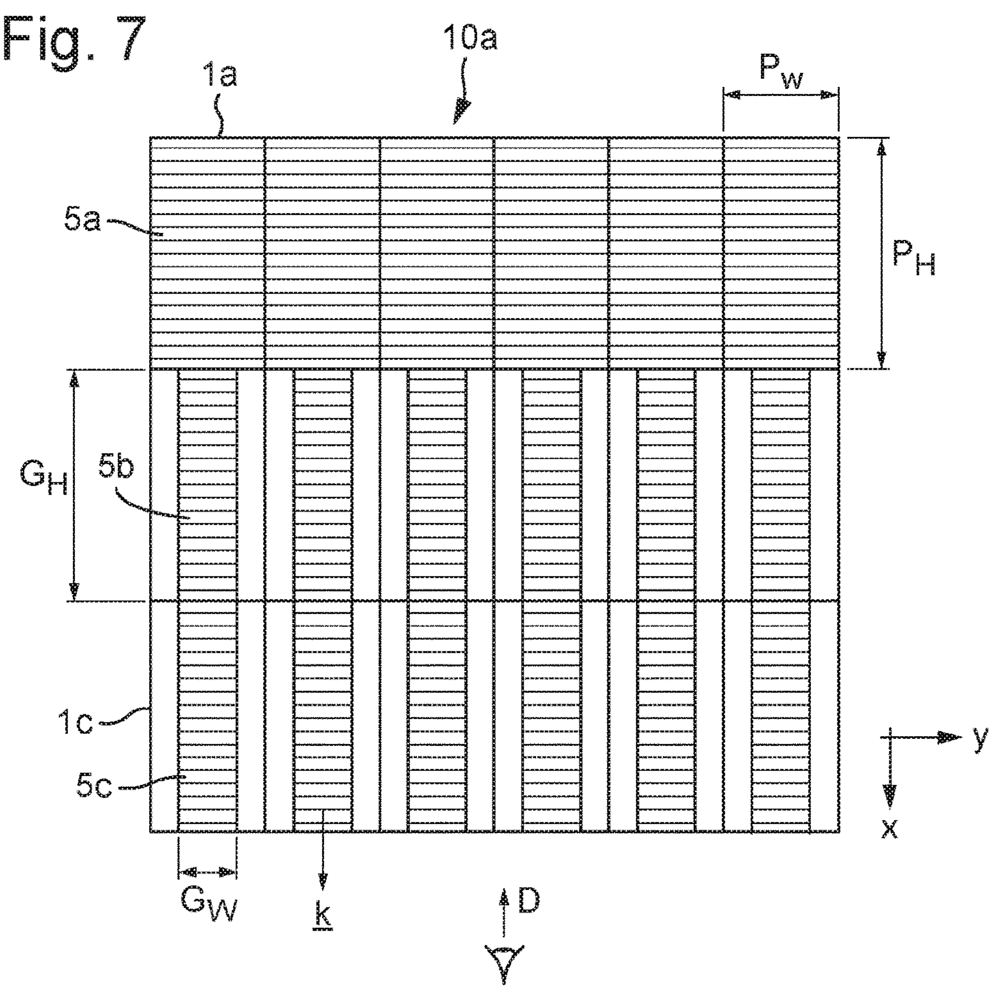
FIG. 7 schematically illustrates an image element according to an embodiment of the invention.

FIG. 7 schematically illustrates an embodiment of the present invention which allows for RGB colour rendering, and maintenance of colour saturation and brightness in the exhibited image as image element and diffractive pixel dimensions are reduced. In FIG. 7, image element 10*a* is again represented, and is desired to exhibit a red-pink colour on illumination at a tilt angle θ~40 degrees, as before. As seen in FIG. 7, each diffractive pixel 1(*a*), 1(*b*), 1*c* is elongate along the viewing direction D such that PH is greater than Pw and consequently each grating region 5*a*, 5*b*, 5*c* is also elongate along the viewing direction. In this example the image element 10*a* consists of six "red" diffractive pixels arranged along the y axis; six "green" diffractive pixels arranged along the y axis and six "blue" diffractive pixels arranged along the y axis.

In the present embodiment, the grating regions 5*b* of the "green" second diffractive pixels 1(*b*) are elongate along the direction of their grating vector k (i.e. along the viewing direction). The percentage coverage of the green diffractive pixels 1(*b*) by the grating regions 5*b* is still 50% (i.e. $P_H \times P_W = 2 \times G_H \times G_W$). However, as the second grating regions 5*b* are elongate along the direction of their grating vector, the number of grating elements aligned along the grating vector k is the same as if the diffractive pixel had 100% coverage, thereby maintaining the resolving power and brightness of the "green" grating regions 5*b* as the size of the grating regions reduces. This advantageously allows for colour images with improved colour saturation and brightness to be exhibited by the security device 100. This provides a striking, easily authenticatable effect to the observer, with the device consequently being more difficult to counterfeit.

In a similar manner, the grating regions 5*c* of the "blue" third diffractive pixels 1*c* are elongate along the direction of their grating vector k (i.e. along the viewing direction), and the percentage coverage of their respective diffractive pixels 1*c* is 50%.

The grating regions 5*a* of the "red" first diffractive pixels 1(*a*) provide 100% percentage coverage of the red diffractive pixels and are thus elongate along the direction of the grating vector k.

As can be seen in FIG. 7, each grating region is elongate along a common first (viewing) direction, and adjacent grating regions along said common first direction (e.g. the grating regions labelled 5*a*, 5*b* and 5*c*) have different grating characteristics; here different pitch. The grating regions of the same colour are adjacent each other along a direction perpendicular to the common first direction (here along the y axis). For example, the "green" grating regions 5*b* are adjacent each other along the y axis.

In FIG. 7, the length, $G_H$, of the grating regions is equal to the length of the diffractive pixels $P_H$ (i.e. 24 microns), and therefore each grating region comprises at least 20 grating elements. As the length $G_H$ of the grating regions is equal to the length of the diffractive pixels, the areal coverage of the diffractive pixels by the respective grating regions is modulated by changing only the width $G_W$ of the grating regions. This advantageously maintains the number of grating elements within each grating region independent of the grating region width. However, in alternative embodiments, the areal coverage of the diffractive pixels by the grating regions may be controlled by modulating both the length, $G_H$, and width, $G_W$, of the grating regions, typically maintaining the elongate nature of the grating regions such that each grating region comprises 20 grating elements. Modulation of both $G_H$ and $G_W$ may be used when larger diffractive pixels are used, for example.

The inventors have found that elongating the grating regions along the direction of the principal plane of dispersion (i.e. reducing their width as compared to conventional square grating regions) does not adversely affect the colours exhibited by the device, and grating regions having a width $G_W$ down to approximately 2 microns may be used. Below 2 microns, undesirable "aperture" diffractive effects may detract from the intended diffractive colour effects provided by the grating elements.

FIG. 7 illustrates a single image element 10*a* with its respective grating regions. However, it will be appreciated that the diffractive structure of the optical device comprises the grating regions of each of the diffractive pixels and image elements.

Figure 8:
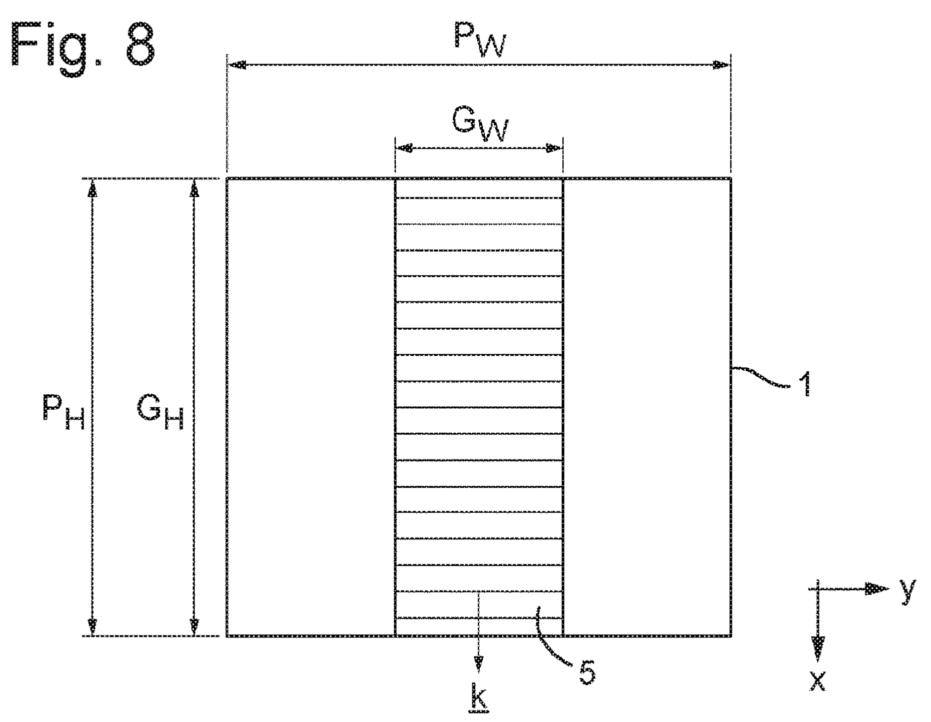
FIG. 8 schematically illustrates the arrangement of a grating region and associated diffractive pixel in accordance with an example of the invention.

FIG. 7 illustrates an embodiment of the invention in which each diffractive pixel of an image element is elongate along the viewing direction. However, it will be appreciated that the diffractive pixels may have a square (or other shape such as circular) geometry and the grating regions for a diffractive pixel requiring a non-100% areal coverage have an elongate geometry. Such an example is illustrated in FIG. 8, where the diffractive pixel 1 requires a non-100% coverage by its associated grating region 5. Typically, the length GH of the grating regions is substantially equal to the length PH of the respective diffractive pixels throughout the diffractive structure, with the percentage coverage of the diffractive pixels being modulated by varying the width GW of the grating regions. Each diffractive pixel typically has a length PH large enough to accommodate at least 20 grating elements along the viewing direction.

Figure 9A:
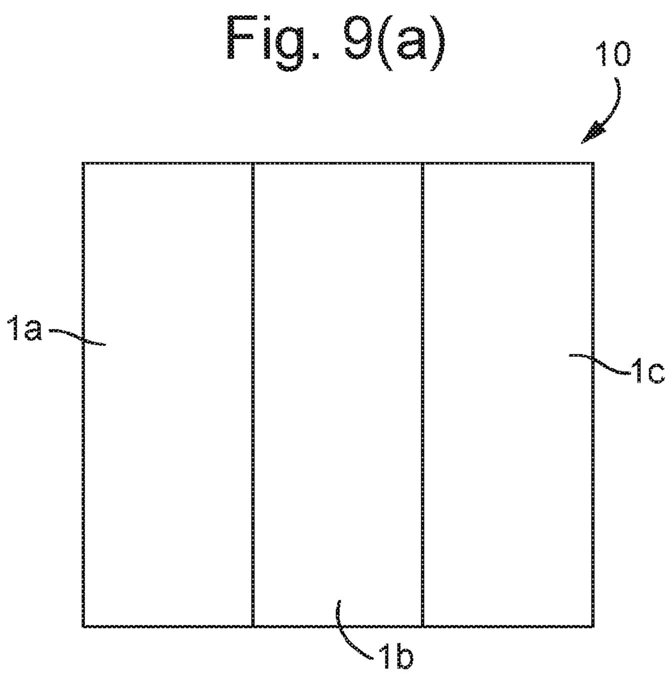
FIGS. 9(*a*) and 9(*b*) schematically illustrate example embodiments of the arrangement of diffractive pixels within an image element in order to provide colour rendering.
Figure 9B:
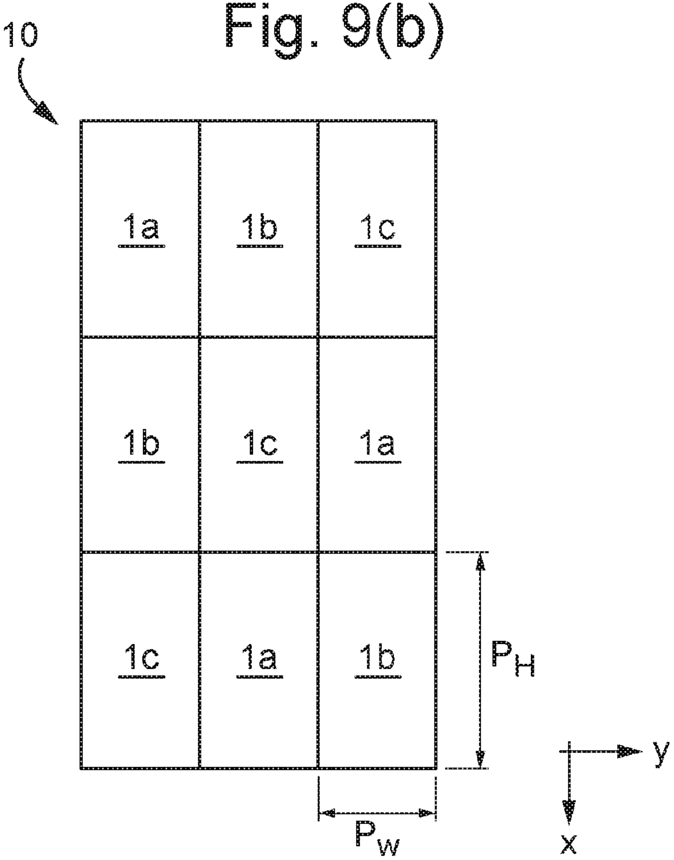

Various arrangements of diffractive pixels within image elements 10 may be used. In one example, each image element may consist of exactly one red diffractive pixel, exactly one green diffractive pixel and exactly one blue diffractive pixel each having the same dimensions and arranged side by side as shown in FIG. 9(*a*). FIG. 9(*b*) schematically illustrates a preferred embodiment of the arrangement of diffractive pixels 1 within an image element 10 in order to provide RGB colour rendering. Each image element 10 comprises nine diffractive pixels 1 arranged as a 3×3 matrix having three rows and three columns. The image element 10 comprises three diffractive pixels 1(*a*) corresponding to the red colour channel; three diffractive pixels 1(*b*) corresponding to the green colour channel; and three diffractive pixels 1*c* corresponding to the blue colour channel. Each column of the unit cell comprises one "red" diffractive pixel 1(*a*), one "green" diffractive pixel 1(*b*) and one "blue" diffractive pixel 1*c*. Similarly, each row of the diffractive pixel 10 comprises one "red" diffractive pixel 1(*a*), one "green" diffractive pixel 1(*b*) and one "blue" diffractive pixel 1*c*. This arrangement of diffractive pixels 1 within an image element 10 advantageously more evenly spreads the red, green and blue colour channels across the domain of the image element 10 (as compared to the arrangement seen in FIG. 7 for example), thereby reducing undesirable artefact patterns within the final colour image that may be perceived by the human eye. The arrangement of diffractive pixels within an image element as illustrated in FIG. 9(*b*) may be seen as a repeating unit cell across the diffractive structure.

Dependent on the dimensions of the diffractive pixels, and the desire that each image element has a dimension less than 100 microns such that it is not discernible to the naked eye, each image element may comprise exactly three "red" diffractive pixels, exactly three "green" diffractive pixels and exactly three "blue" diffractive pixels in the unit cell arrangement shown in FIG. 9(*b*).

The above description of the use of elongate grating regions for colour rendering may be applied to devices exhibiting a single high resolution diffractive colour image, or in devices exhibiting variable images comprising two or more image frames.

Figure 10:
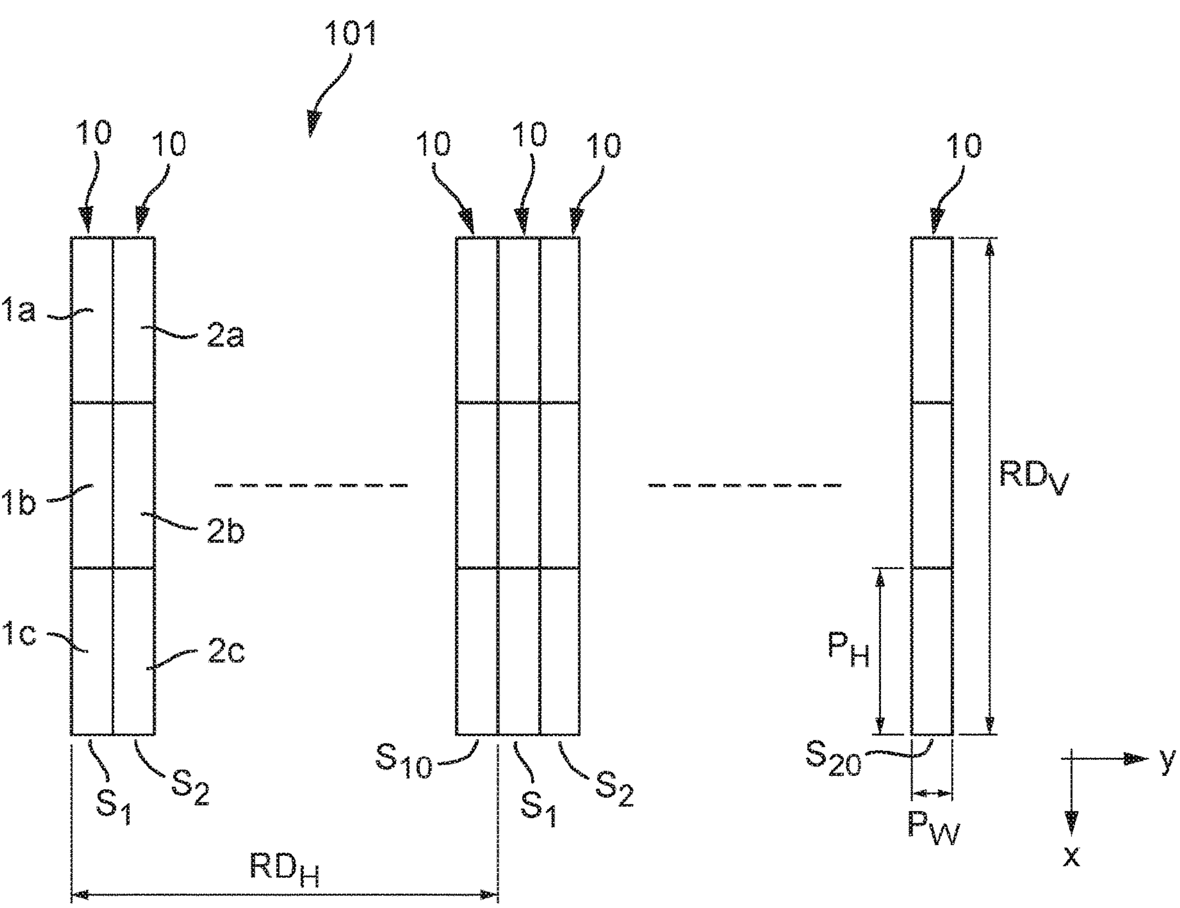
FIG. 10 schematically illustrates an embodiment of the invention where the optical device is arranged to exhibit a variable image.
Figure 12A:
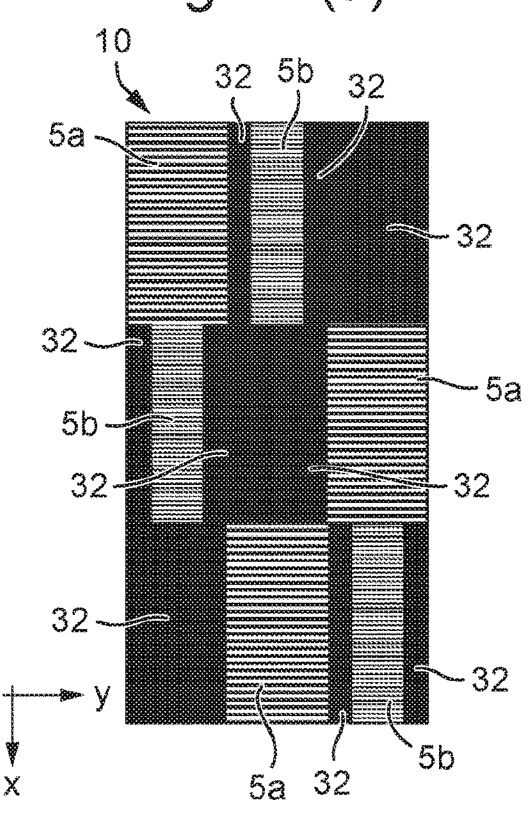
FIGS. 12(*a*) to 12(*d*) illustrate different ways in which the areal coverage of the diffractive pixels by grating regions may be effected.
Figure 12B:
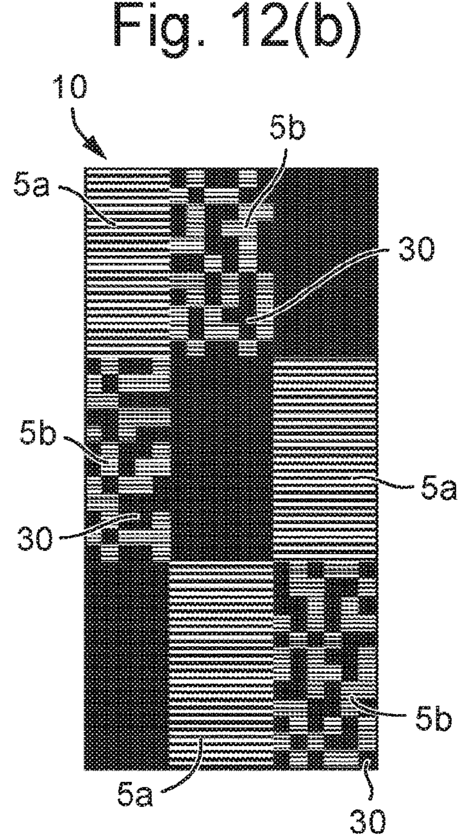
Figure 12C:
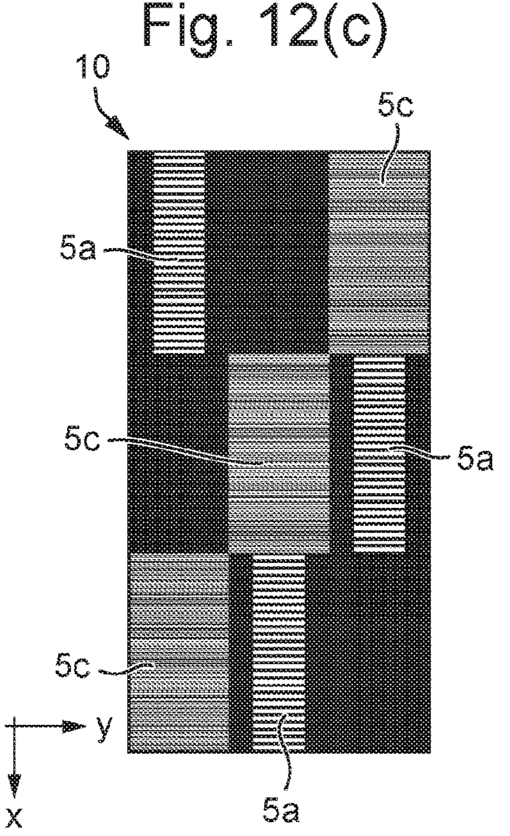
Figure 12D:
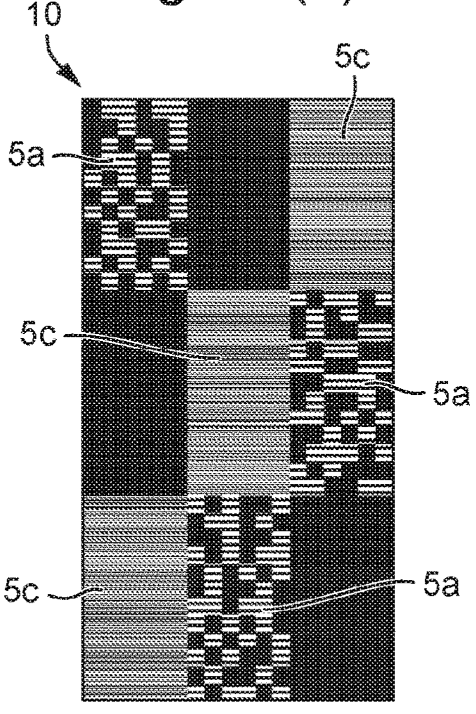

FIG. 10 schematically represents a diffractive structure 101 of a security device 100 according to an embodiment of the invention, and illustrates how colour rendering may be used within variable images that exhibit a plurality of image frames. The diffractive structure is arranged in accordance with a plurality of image elements 10 each being assigned a uniform colour. In this exemplary embodiment, the variable image comprises 20 frames.

Each frame of the variable image is a diffractive image in its own right, and is divided into a plurality of image segments that together cooperate to form the image of that frame. The image elements 10 of the diffractive structure 101 are arranged as sets of diffractive image segments that correspond to the image segments. Each diffractive image segment, or diffractive image "strip", is elongate along the viewing direction (i.e. along the x axis), with the diffractive image segments of the plurality of the frames interleaved with each along the direction perpendicular to the viewing direction (i.e. along the y axis), as schematically shown in FIG. 10. Here, the diffractive image segments of frame 1 are labelled $S_1$, the diffractive image segments of frame 2 are labelled $S_2$ etc. up to diffractive image segments $S_{20}$.

In this embodiment, the diffractive image segments are illustrated as being linear. This is preferably the case, but in other embodiments the diffractive image segments may take other forms, for example having a curvilinear geometry.

For clarity of description, a single image element 10 of each diffractive image segment S is illustrated, with each image element 10 having diffractive pixels 1(*a*), 1(*b*), 1*c* corresponding to red, green and blue colour channels respectively. However, it will be appreciated that each image segment will typically comprise a plurality of such image elements. Here each image element 10 consists of three diffractive pixels "stacked" one above the other along the viewing (x) direction. Thus, the width of an image element corresponds to the width of a diffractive pixel. For clarity, in FIG. 10 the diffractive pixels are shown without their corresponding grating regions, but it will be appreciated that RGB colour rendering for each image element 10 is enabled by corresponding areal coverage of the diffractive pixels by grating regions of the requisite pitch.

The diffractive structure 101 has a horizontal repeat distance ($RD_H$) along the direction of interleaving (i.e. along the y axis) as illustrated in FIG. 10. In the FIG. 10 example, each diffractive image segment S is one diffractive pixel wide, and therefore the use of diffractive pixels which are elongate along the x axis (viewing direction) advantageously reduces this horizontal repeat distance as compared to conventional devices.

Figure 11:
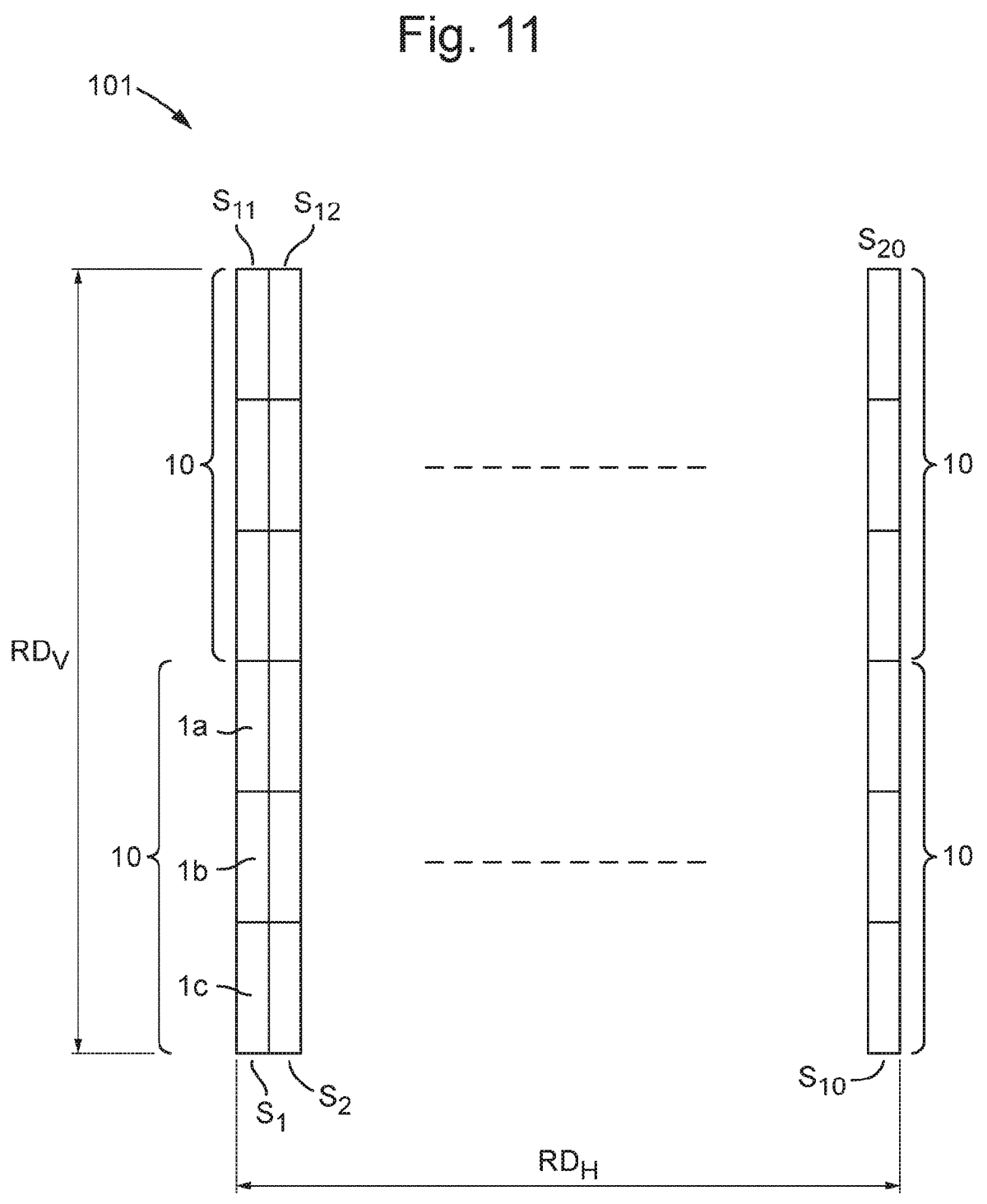

The horizontal repeat distance within a spatially multiplexed image may be further reduced by "stacking" the diffractive image segments along the direction in which the diffractive pixels are elongate, as described above with reference to FIG. 4. FIG. 11 schematically illustrates how the 20 diffractive image segments may be arranged in two rows of ten, thereby reducing the repeat distance in the horizontal direction ($RD_H$) by a factor of two in comparison to that shown in FIG. 10. However, the repeat distance in the vertical direction ($RD_V$) is increased by a factor of two. Thus, the elongate dimension of the diffractive pixels may have to be reduced in order for the repeat distance RDv to remain undiscernible to the naked human eye.

Particularly preferred dimensions for the diffractive pixels are 6 microns×15 microns, which in the arrangement of FIG.

11 gives a horizontal repeat distance of 60 microns and a vertical repeat distance of 90 microns. Both of these dimensions are less than 100 microns and so the interleaving structure is not readily discernible by the naked human eye.

Thus far, for colour rendering the modulation of the areal coverage of the diffractive pixels by the grating regions has been performed by changing the dimensions of the grating regions, primarily by varying the "width" (i.e. a dimension perpendicular to the viewing direction) of the grating regions. FIG. 12(*a*) illustrates an image element 10 having a unit cell arrangement of diffractive pixels as described above in relation to FIG. 9, and shows the respective "red" grating regions 5*a* and "green" grating regions 5*b* covering the requisite proportions of the respective diffractive pixels in order that the image element 10 exhibits a uniform orange colour across its domain. Here the percentage coverage of the red diffractive pixels is 100%; the percentage coverage of the green diffractive pixels is 50% and the percentage coverage of the blue diffractive pixels is 0% (i.e. no grating regions present). Each "green" grating region 5*b* is adjacent a "red" grating region along the common direction of elongation.

In this example embodiment, the coverage of the diffractive pixels is modulated by varying the width of the grating regions. If we consider the "green" diffractive pixels which have a 50% coverage, we can view the modulation of the grating region width as being effected by masking elements 32 in which there are no grating regions present. Varying the width of the masking elements 32 modulates the width of the grating regions. Thus, for this exemplary orange diffractive pixel, "red" diffractive pixels have no masking elements, and "blue" diffractive pixels have a masking element that covers the whole of that diffractive pixel. The masking elements together may be considered as a "mask".

FIG. 12(*b*) illustrates an image element 10 (again designed to exhibit a perceived orange colour) according to a preferred embodiment of the invention in which the mask is arranged in accordance with a dithering arrangement. The dithering arrangement is applied to diffractive pixels requiring a grating region percentage coverage of greater than 0% and less than 100% (i.e. in this case the "green" diffractive pixels). In such diffractive pixels, the dithering mask comprises a plurality of dithering elements (shown generally at 30) in which there are no grating regions present, and which are arranged in accordance with a dithering algorithm such that the percentage coverage of the diffractive pixel by the grating region is still (in this example) 50%. Preferred dithering algorithms include Jarvis dithering and Floyd-Steinberg dithering, but other forms of dithering such as half-toning are contemplated.

The use of dithering advantageously increases the apparent range of colours ("colour palette") that can be used for the diffractive images, in the same manner that dithering can be used to increase the apparent number of grayscale levels present in an image comprising only black and white pixels. Dithering also beneficially reduces artefact macro patterns (such as colour banding) in the exhibited images.

Each individual dithering element 30 has a dimension ("width") in the y direction perpendicular to the viewing direction that is at least two times smaller than a width of the respective diffractive pixel. In this manner, the grating region of each diffractive pixel where a dithering mask has been used remains a single coherent grating region that exhibits the desired diffractive colour in the proportion required for colour rendering. In the example of FIG. 12(*b*), each dithering element has square geometry (although other geometries such as rectangular geometry are contemplated) and has a width that is one sixth of the width of the diffractive pixel.

As the dithering elements have a width that is at least two times smaller than a width of the respective diffractive pixel, this means that the density of the dithering elements may vary within a diffractive pixel. Advantageously therefore, dithering allows a further increase in the apparent colour palette exhibited by the device, in contrast to non-dithering embodiments where the areal coverage of the diffractive pixels by the corresponding grating regions is constant within a diffractive pixel.

As can be clearly seen in FIGS. 12(*a*) and 12(*b*), the grating regions of the "red" and "blue" diffractive pixels (i.e. those requiring exactly 100% or exactly 0% coverage) have the same arrangement in both the dithering and non-dithering embodiments.

FIGS. 12(*c*) and 12(*d*) are similar to FIGS. 12(*a*) and 12(*b*) but illustrate an image element comprising grating regions arranged across the diffractive pixels such that the image element is perceived to exhibit a magenta colour (R=128, G=0, B=255). In other words, here the "red" diffractive pixels have 50% coverage, the "green" diffractive pixels have 0% coverage and the "blue" diffractive pixels have 100% coverage.

Figure 13A:
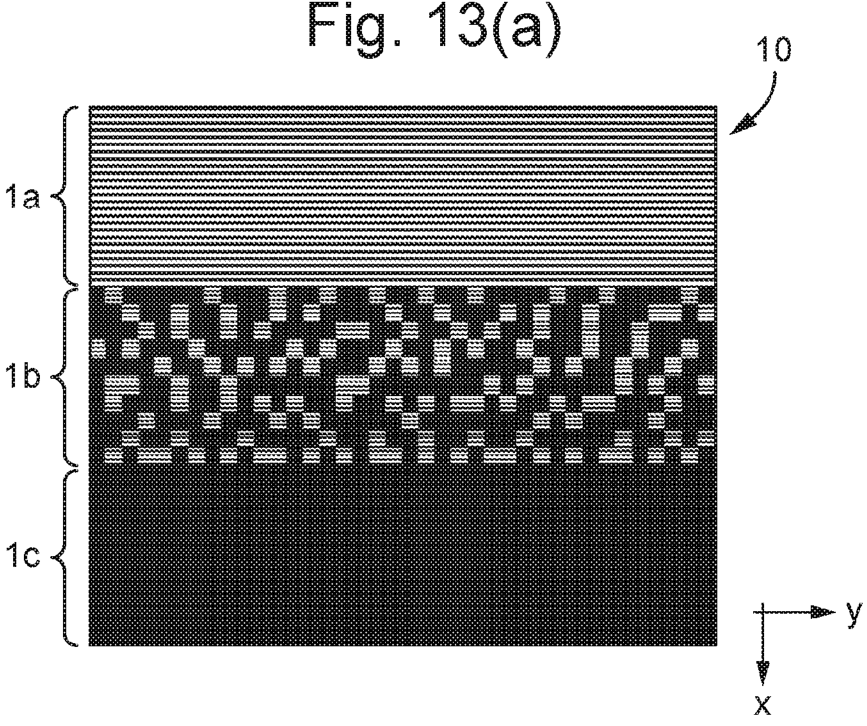
FIGS. 13(*a*) and 13(*b*) illustrate example diffractive pixels using a dithering arrangement for colour rendering.
Figure 13B:
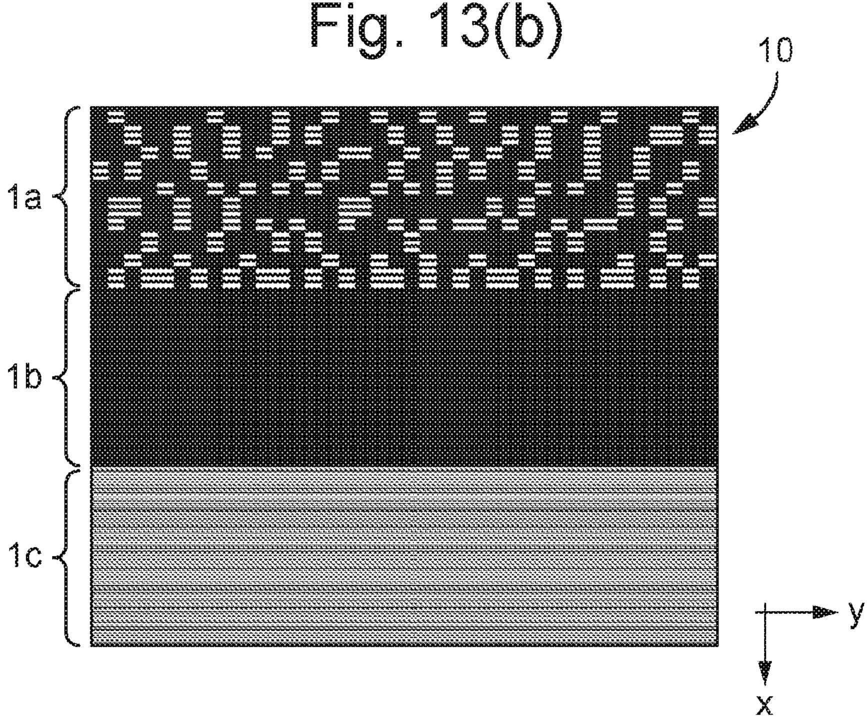

FIG. 13(*a*) schematically illustrates an image element 10 according to an aspect of the invention. Here, the image element 10 comprises "red", "green" and "blue" diffractive pixels 1(*a*), 1(*b*), and 1*c* to allow for RGB colour rendering. The "red", "green" and "blue" grating regions in FIG. 13(*a*) are arranged in accordance with a dithering arrangement such that the unit cell is perceived to exhibit an orange colour. Similarly, the grating regions in FIG. 13(*b*) are arranged in accordance with a dithering arrangement such that the unit cell is perceived to exhibit a magenta colour. The use of dithering to provide colour rendering may be used in embodiments where elongate grating regions are not used.

Figure 14:
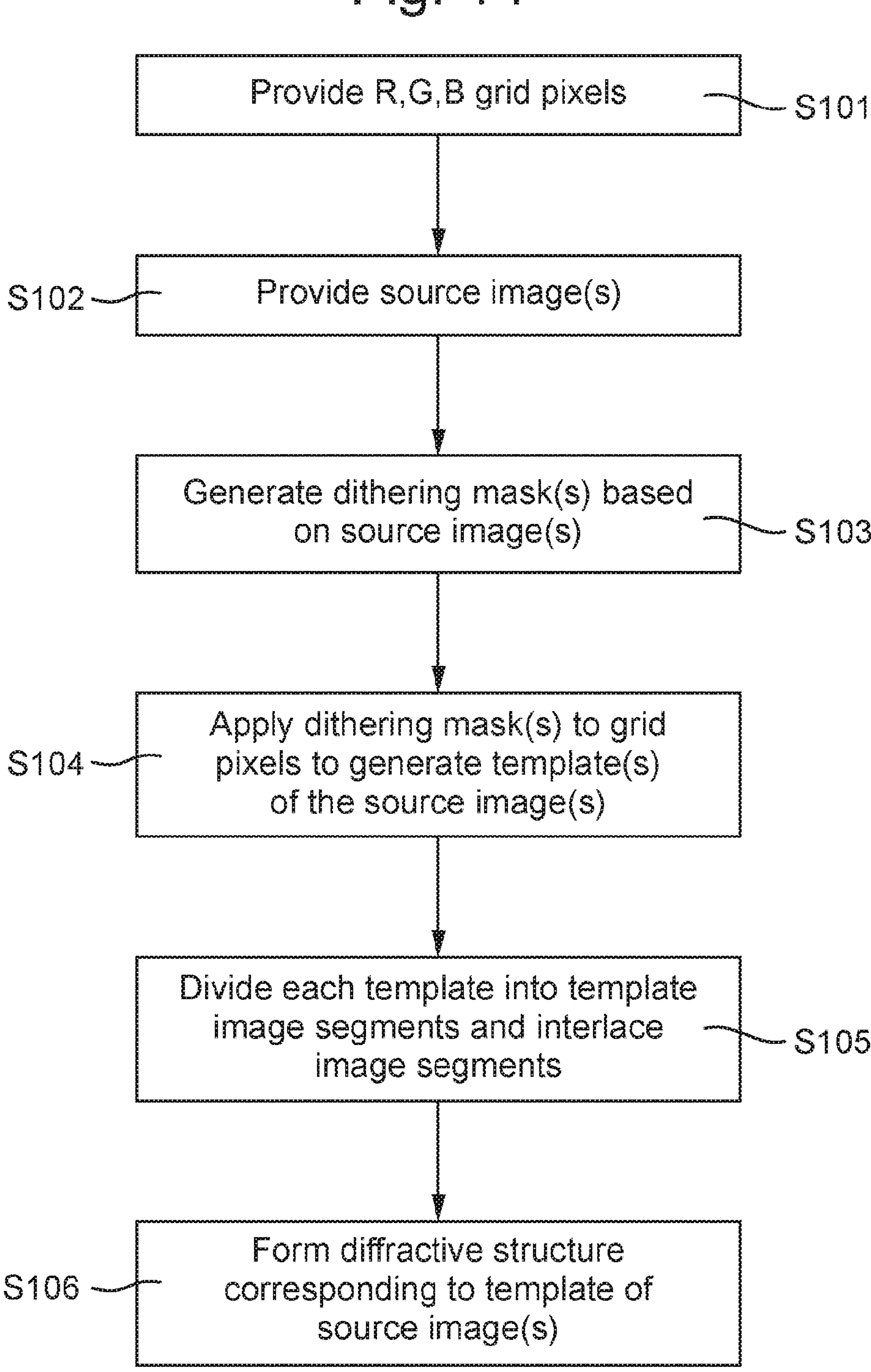
FIG. 14 is a flow diagram setting out selected steps of a preferred method for manufacturing an optical device according to the invention.

FIG. 14 is a flow diagram setting out selected steps of a preferred method for manufacturing an optical device according to the invention, where colour rendering by dithering is used.

The process begins at step S101 by providing a grid of "red", "green" and "blue" grid pixels configured as a repeating arrangement of unit cells, such as the arrangement illustrated in FIG. 9(*a*) or 9(*b*). Other such arrangements of the RGB grid pixels may be used, however. The pixels of the grid are chosen to have the desired dimensions for the device; for this example each grid pixel has a length of 35 microns and a width of 15 microns (horizontal resolution~1667 dpi). The size of the grid pixels to be used for the diffractive structure may be chosen independently of any source image that is desired to be exhibited by the device. In another example the size of the gird pixels may be a function of the size of the source image pixels, especially when colour rendering using dithering is used. For example, each grid pixel may be the same size as a 2×8 array of source image pixels.

At step S102 one or more source images P that are to be exhibited by the optical device 100 are provided. Each source image may be obtained by sampling a respective original input image accordingly. Therefore, such an original input image could be of any file type such as a bitmap, jpeg, gif or the like, and is typically colour image. The source image(s) has a horizontal resolution that is greater than that of the RGB grid, with the source image(s) preferably having a resolution above 3600 dpi (image pixel size~7 microns).

At step S103, a dithering mask is generated for each sampled source image. Each dithering mask comprises a plurality of dithering elements that are applied to the RGB grid pixels such that the proportions of the unmasked areas of the grid pixels in combination exhibit the respective source image. Due to the resolution of the sampled source image(s) being greater than that of the RGB grid, the dithering elements are smaller (preferably at least two times smaller) than the width of an individual grid pixel. In the final device, this ensures that the pattern of grating elements within each diffractive pixel is not interrupted, and thus the grating elements maintain their coherence.

At step S104 the dithering mask(s) is applied to the grid of RGB pixels to form an arrangement of template pixels for each source image. Each template pixel is the resultant of a grid pixel of the pre-formed RGB grid combined with the respective dithering mask obtained from sampling the respective source image. In practice this is typically performed by merging a digital file defining the RGB grid with a digital file defining the dithering mask in order to form a template pixel file.

The template pixels are arranged to form one or more templates T corresponding to the respective one or more source images P. This results in an array of non-masked regions (which may be thought of as red, green and blue "colour zones") corresponding to the proportions of the respective colour channels to be exhibited within the diffractive pixels of the resulting device in order that the source image(s) are exhibited. In other words, the colour values obtained by sampling the source image(s) are used to modify the proportions of the red, green and blue colour channels to be exhibited, through the use of the dithering mask. The dithering mask is typically generated using a Stucki dithering algorithm, but other forms of dithering may be used such as Jarvis dithering, Floyd-Steinberg dithering or half-tone for example.

The device may be designed to exhibit a single diffractive image, in which case the method moves on to step S106. Alternatively, if the device is designed to exhibit multiple source images as image frames of a spatially multiplexed image, the method moves to step S105. In step S105, each template T is divided into (typically linear) template image segments, and the template image segments of different templates are interlaced with each other. As has been explained herein, the interlacing is typically in a direction perpendicular to the intended viewing direction, and may be in a "stacked" or "grid" form. The interlaced template image segments form a final template having an array of masked and non-masked regions from which the diffractive structure is formed in step S106.

In step S106, the diffractive structure is formed based on the generated final template, with each grating region of the diffractive structure corresponding to a non-masked region (or "colour zone") of the template. In the examples described above, the device is intended to be viewed at a first tilt θ of approximately 40 degrees, and thus the grating elements of the "red" grating regions have a pitch P of 1.0 microns, the grating elements of the "green" grating regions have a pitch P of 0.9 microns, and the grating elements of the "blue" grating regions have a pitch P of 0.7 microns. The grating regions may be formed using any suitable method such that each grating region is coherent. This is preferably ensured by forming each grating region in a single working. A particularly preferred method of forming the grating regions is electron beam lithography.

Figure 22:
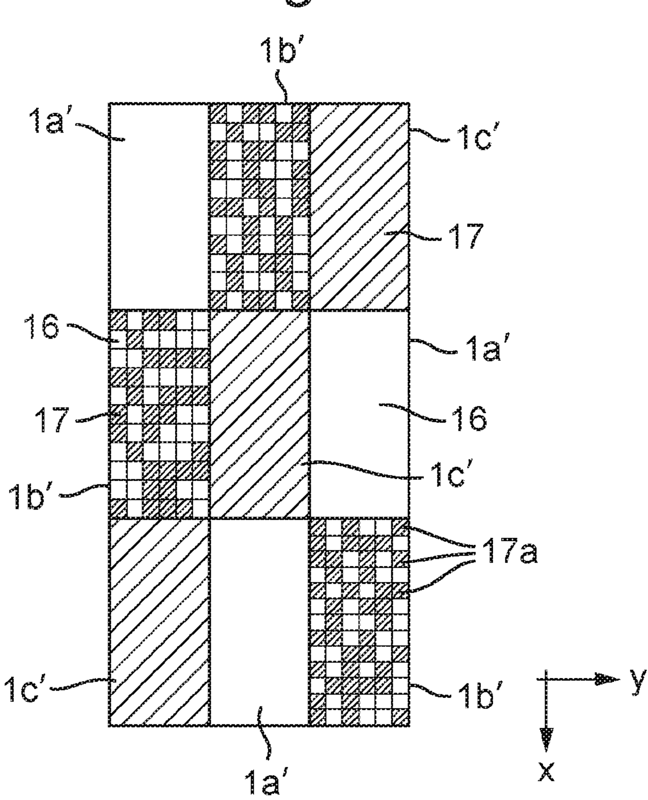
FIGS. 22 and 23 schematically illustrate arrangements of template pixels from which grating regions of the diffractive device may be formed.

FIG. 22 schematically illustrates an arrangement of template pixels (i.e. combination of grid pixels and mask) where the mask is in the form of a dithering arrangement. This arrangement corresponds to the image element described in FIG. 12(*b*). In this example, the "red" grid pixels are not covered by an masking elements and form template pixels 1*a*', the "green" grid pixels are covered by masked regions 17 in the form of dithering elements 17*a* so as to form template pixels 1*b*', and the "blue" grid pixels are fully covered by masked regions 17 so as to form template pixels 1*c*'. The grating regions are formed in accordance with the non-masked regions 16 so as to generate the diffractive structure (in this case is illustrated in FIG. 12(*b*)).

Figure 23:
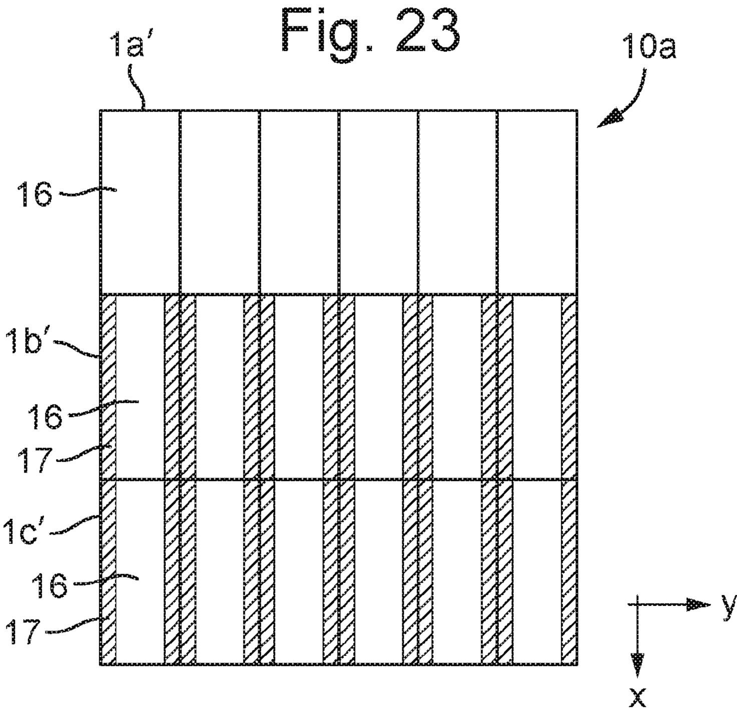

In the example outlined above the mask is in the form of a dithering arrangement comprising a plurality of dithering elements. However, it will be appreciated that the mask may be formed so as to define elongate grating regions, as illustrated in FIG. 23. FIG. 23 illustrates an arrangement of "red" template pixels 1*a*', "green" template pixels 1*b*' and "blue" template pixels 1*c*' (one of each is labelled for simplicity) formed from combining the mask with the grid pixels. The arrangement in FIG. 23 may be used to form the image element 10*a* described in FIG. 7. Here, the mask is generated such that the image element 10*a* exhibits a red-pink colour, and therefore comprises masked regions 17 (shaded) that cover 50% of each "green" and "blue" grid pixel so as to generate the corresponding template pixel. The resulting non-masked regions in which the gratings are formed are indicated at 16.

Figure 15:
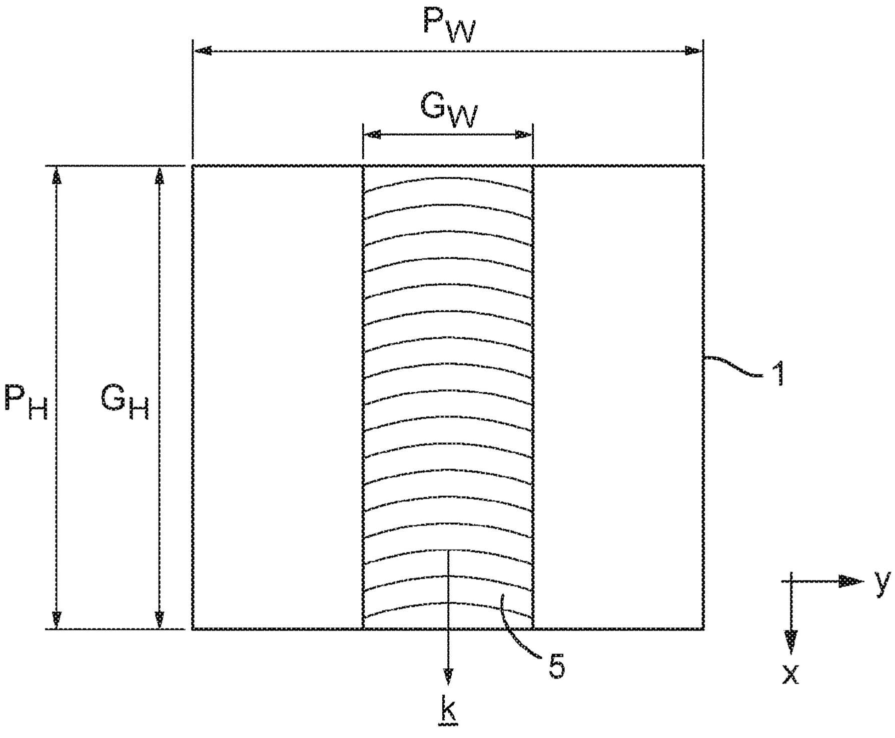
FIG. 15 is a schematic view of a grating region comprising curved grating elements, according to an embodiment of the invention.

In the examples that have been provided thus far, each grating element has been substantially linear. However, it is envisaged that curved grating elements having a principal component of orientation that is substantially orthogonal to the first direction may be used. FIG. 15 illustrates a diffractive pixel 1 having a grating region 5 covering a proportion thereof in a similar manner to that shown in FIG. 8. Here, the grating elements are curved, with each part of an individual grating element having a principal component of orientation along the y axis, i.e. perpendicular to the viewing direction. In this example, the curvature is symmetric such that the resultant grating vector k is orientated along the viewing direction.

Figure 16A:
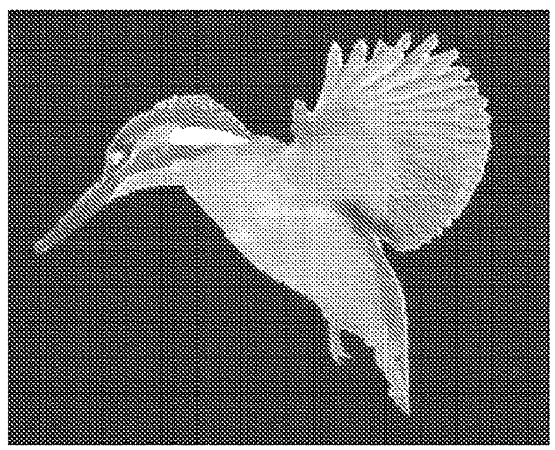
FIGS. 16(*a*), 16(*b*), 17(*a*) and 17(*b*) illustrate images that are exhibited by optical devices according to the invention.
Figure 16B:
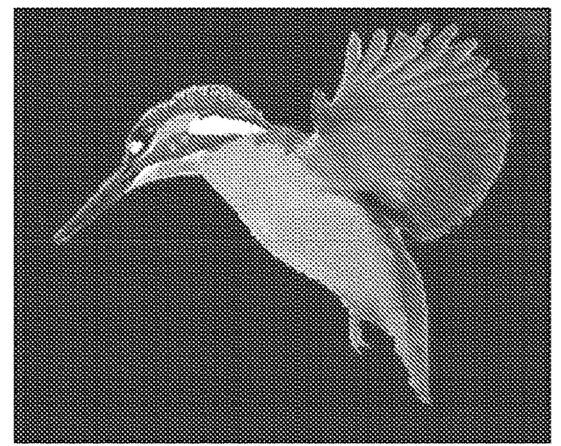

FIG. 16(*a*) illustrates a single colour image exhibited by a device produced in accordance with prior art methods using conventional square grating regions in which the number of grating elements within a grating region is reduced in order to provide colour rendering. FIG. 16(*b*) illustrates the same image produced by a device according to the invention, whereby each diffractive pixel and each grating region is elongate. The colour rendering in FIG. 16(*b*) is provided by stochastic dithering in the manner described above. The devices exhibiting the images seen in FIGS. 16(*a*) and 16(*b*) were illuminated under the same lighting conditions, and had the same grating element characteristics. As can clearly be seen, the image in FIG. 16(*b*) has improved colour saturation and brightness (and therefore increased contrast) as compared to the prior art image seen in FIG. 16(*a*). A counterfeit device (e.g. using conventional square grating regions) exhibiting an image as seen in FIG. 16(*a*) would thus be easily spotted.

Figure 17A:
Figure 17B:

In a similar manner, FIG. 17(*a*) illustrates a frame of a variable image exhibited by a prior art device, with FIG. 17(*b*) showing the same variable image exhibited by a device made using elongated diffractive pixels and stochastic dithering colour rendering according to the invention. Here, upon tilting of the device about a tilt axis parallel with the viewing direction, the observer perceives an animation effect of the bird's wings flapping. As can be seen, the image in FIG. 17(*b*) has increased colour saturation and contrast compared to the prior art image seen in FIG. 17(*a*).

In the example optical devices that have been described so far, each grating region comprises a plurality of grating elements arranged along the same first direction. In other words, each grating element of the diffractive structure has a common principal component of orientation and the device is intended to be viewed within a principal plane of dispersion that intersects the device along one viewing direction D. However, it is envisaged that different grating regions of the diffractive structure may comprise grating elements arranged along different (preferably orthogonal) directions, and this is schematically illustrated in FIG. 18.

Figure 18:
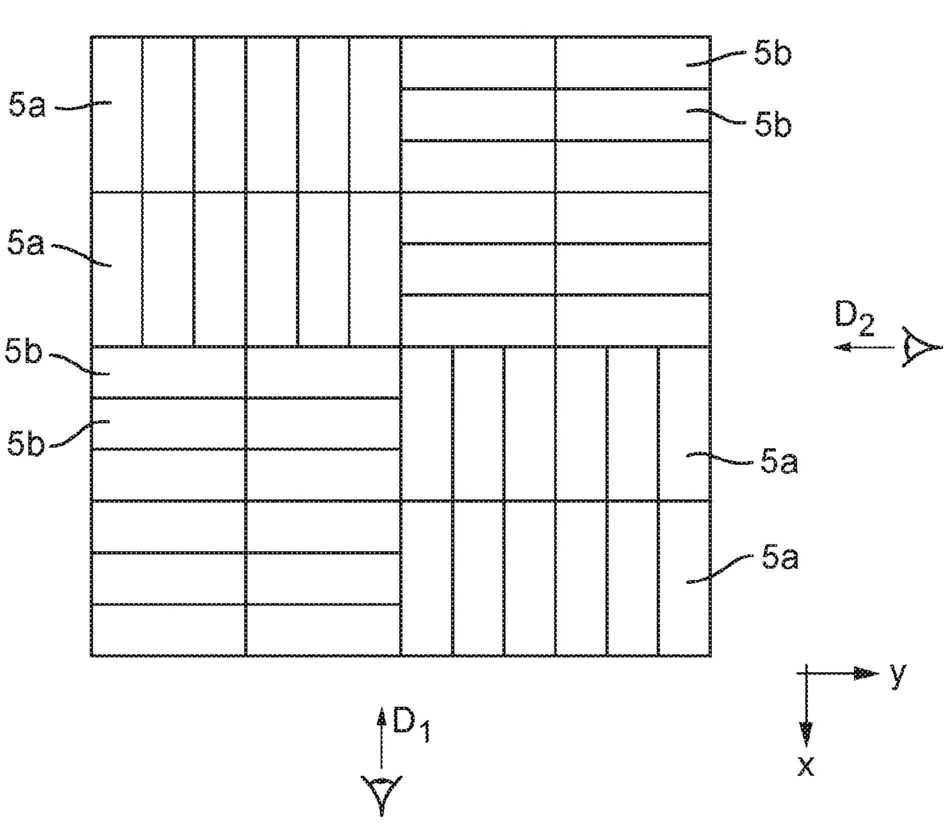
FIG. 18 schematically illustrates a part of a diffractive structure according to a further embodiment of the invention.

FIG. 18 illustrates a portion of a diffractive structure comprising first grating regions that are elongate along the x axis (generally shown at 5*a*) and second grating regions that are elongate along the y axis (generally shown at 5*b*). Hence, the first grating regions 5*a* comprise grating elements arranged along the x axis and are intended to be viewed along a first viewing direction D1 and second grating regions 5*b* comprise grating elements arranged along the y axis and are intended to be viewed along a second, orthogonal, viewing direction D2. As shown in FIG. 18, the first and second grating regions are interlaced along both the x and y axes.

Thus, such devices may exhibit single or variable diffractive images dependent on viewing angle when the device is viewed within two different principal planes of dispersion (i.e. when viewed along two different viewing directions D1 and D2). This dramatically increases the difficulty of counterfeit and therefore the security level of such devices when used for security purposes.

It will be appreciated that due to the interlacing of the first and second (or more) grating regions, the resolution of the diffractive images will be reduced as compared to embodiments where the device is intended to be viewed along a single viewing direction.

Optical devices of the sorts described above can be incorporated into or applied to any product for which an authenticity check is desirable; in which case they act as security devices. In particular, such devices may be applied to or incorporated into documents of value such as banknotes, passports, driving licences, cheques, identification cards etc. The complete security device can either be formed directly on the security document or may be supplied as part of a security article, such as a security thread or patch, which can then be applied to or incorporated into such a document.

Such security articles can be arranged either wholly on the surface of the base substrate of the security document, as in the case of a stripe or patch, or can be visible only partly on the surface of the document substrate, e.g. in the form of a windowed security thread. Security threads are now present in many of the world's currencies as well as vouchers, passports, travellers' cheques and other documents. In many cases the thread is provided in a partially embedded or windowed fashion where the thread appears to weave in and out of the paper and is visible in windows in one or both surfaces of the base substrate. One method for producing paper with so-called windowed threads can be found in EP-A-0059056. EP-A-0860298 and WO-A-03095188 describe different approaches for the embedding of wider partially exposed threads into a paper substrate. Wide threads, typically having a width of 2 to 6 mm, are particularly useful as the additional exposed thread surface area allows for better use of optically variable devices, such as that presently disclosed.

The security article may be incorporated into a paper or polymer base substrate so that it is viewable from both sides of the finished security substrate at at least one window of the document. Methods of incorporating security elements in such a manner are described in EP-A-1141480 and WO-A-03054297. In the method described in EP-A-1141480, one side of the security element is wholly exposed at one surface of the substrate in which it is partially embedded, and partially exposed in windows at the other surface of the substrate.

Base substrates suitable for making security substrates for security documents may be formed from any conventional materials, including paper and polymer. Techniques are known in the art for forming substantially transparent regions in each of these types of substrate. For example, WO-A-8300659 describes a polymer banknote formed from a transparent substrate comprising an opacifying coating on both sides of the substrate. The opacifying coating is omitted in localised regions on both sides of the substrate to form a transparent region. In this case the transparent substrate can be an integral part of the security device or a separate security device can be applied to the transparent substrate of the document. WO-A-0039391 describes a method of making a transparent region in a paper substrate. Other methods for forming transparent regions in paper substrates are described in EP-A-723501, EP-A-724519, WO-A-03054297 and EP-A-1398174.

The security device may also be applied to one side of a paper substrate, optionally so that portions are located in an aperture formed in the paper substrate. An example of a method of producing such an aperture can be found in WO-A-03054297. An alternative method of incorporating a security element which is visible in apertures in one side of a paper substrate and wholly exposed on the other side of the paper substrate can be found in WO-A-2000/39391.

Figure 19A:
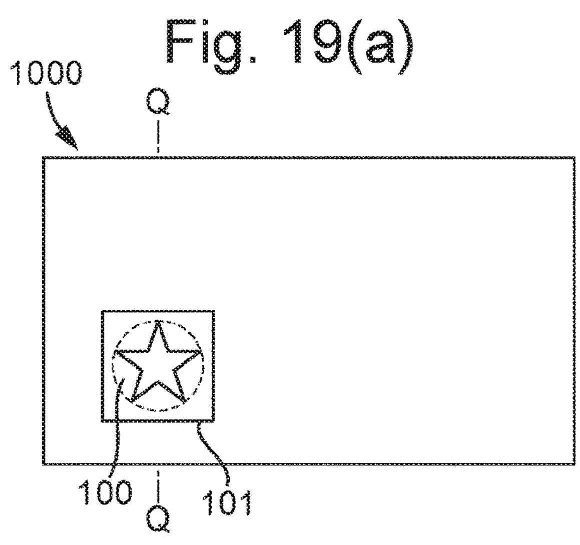
FIGS. 19 to 21 illustrate examples of incorporating security devices according to the invention into security documents.
Figure 19B:
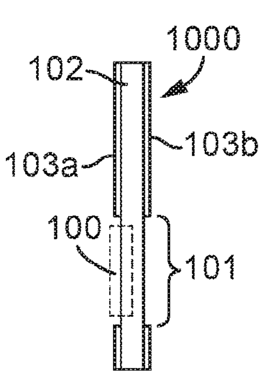
Figure 20A:
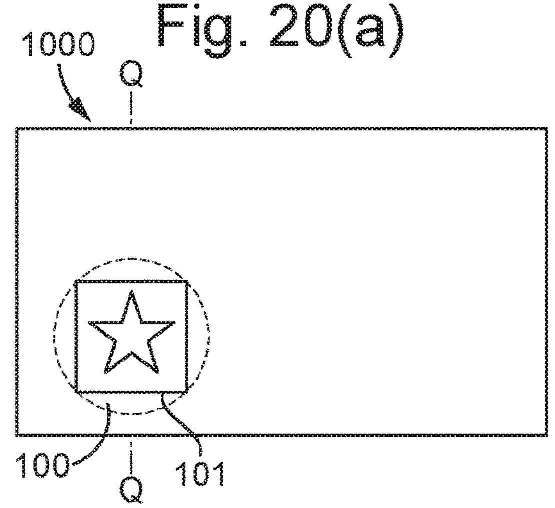
Figure 20B:
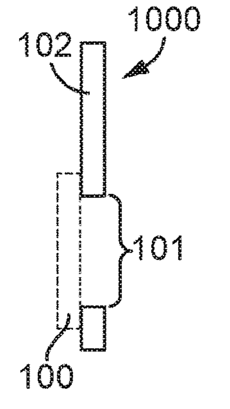
Figure 20B:
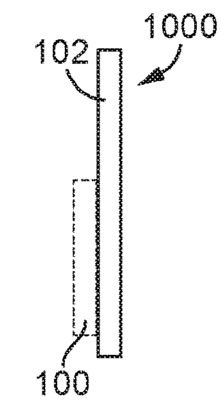
Figure 21A:
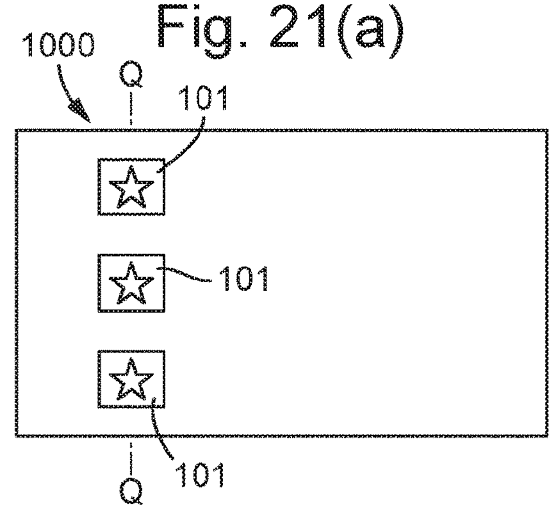
Figure 21B:
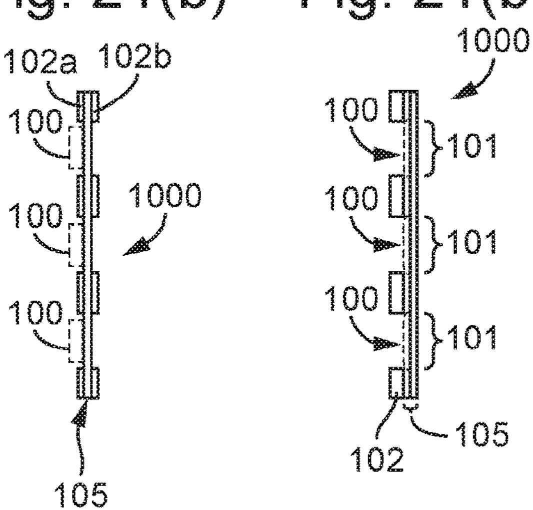

The device of the present invention is principally designed for viewing in reflection, in which case the diffractive structure will have a thin reflective metal or high refractive index coating applied to it. However, the device of the present invention may be designed to be viewed transmission. FIGS. 19, 20 and 21 depict examples of security documents in which security devices of the sorts described above have been incorporated. For clarity of description, the diffractive image exhibited by the security device in the following figures is illustrated by a star. FIG. 19 shows a first exemplary security document, here a banknote 1000, in (a) plan view and (b) cross-section along line Q-Q'. Here, the banknote 1000 is a polymer banknote, comprising an internal transparent polymer substrate 102 which is coated on each side with opacifying layers 103*a* and 103*b* in a conventional manner. In some cases, the opacifying layers may be provided on one side of the substrate 102 only. The opacifying layers 103*a* and 103*b* are omitted in a region of the document so as to define a window 101, here having a square shape. Within the window region 101 is located a security device 100 in accordance with any of the embodiments discussed above. The security device 100 may be formed by applying a suitable resist material onto the substrate 102, in which the diffractive structure is formed. Alternatively, the security device 100 may have been formed separately on a security article such as a transfer patch or label. In this case, the security device 100 may be affixed to the transparent substrate 102 inside the window region 101 by means of a suitable adhesive. Application may be achieved by a hot or cold transfer method e.g. hot stamping.

It should be noted that a similar construction could be achieved using a paper/plastic composite banknote in which the opacifying layers 103*a* and 103*b* are replaced by paper layers laminated (with or without adhesive) to an internal transparent polymer layer 102. The paper layers may be omitted from the window region from the outset, or the paper could be removed locally after lamination. In other constructions, the order of the layers may be reversed with a (windowed) paper layer on the inside and transparent polymer layers on the outside.

FIG. 19 shows the use of a "full" window where the regions where the opacifying layers are omitted are in register. It will be appreciated that the device 100 may be applied in a "half window", for example in a case where opacifying layer 103*b* was present across window region 101.

In FIG. 20, the banknote 1000 is of conventional construction having a substrate 102 formed for example of paper or other relatively opaque or translucent material. The window region 101 is formed as an aperture through the substrate 102. The security device 100 is applied as a patch overlapping the edges of window 101 utilising an adhesive to join the patch security article to the document substrate 102. Again, the application of the security device and document could be achieved using various methods including hot stamping. FIG. 20(*b*) shows a variant in which the window 101 is omitted and the device 100 is simply applied to a section of the substrate 102 using any convenient application technique such as hot stamping. In such arrangements the device 100 will of course only be viewable from one side of the security document 100.

FIG. 21 depicts a third example of a security document, again a banknote 1000, to which a security article 105 in the form of a security thread or security strip has been applied. Three security devices 100 each carried on the strip 105 are revealed through windows 101, arranged in a line on the document 1000. Two alternative constructions of the document are shown in cross-section in FIGS. 21(*b*) and 21(*c*). FIG. 21(*b*) depicts the security thread or strip 105 incorporated within the security document 1000, between two portions of the document substrate 102(*a*), 102(*b*). For example, the security thread or strip 105 may be incorporated within the substrate's structure during the paper making process using well known techniques. To form the windows 101, the paper may be removed locally after completion of the paper making process, e.g. by abrasion. Alternatively, the paper making process could be designed so as to omit paper in the desired window regions. FIG. 21(*c*) shows an alternative arrangement in which the security thread or strip 105 carrying the security device 100 is applied to one side of document substrate 102, e.g. using adhesive. The windows 101 are formed by the provision of apertures in the substrate 102, which may exist prior to the application of strip 105 or be formed afterwards, again for example by abrasion.

Many alternative techniques for incorporating security documents of the sorts discussed above are known and could be used. For example, the above described device structures could be formed on other types of security document including identification cards, driving licenses, bankcards and other laminate structures, in which case the security device may be incorporated directly within the multilayer structure of the document.

The invention claimed is:

1. An optical device that, upon illumination, exhibits one or more diffractive images dependent upon viewing angle, the optical device having a diffractive structure comprising a plurality of grating regions, each grating region corresponding to a component of a respective diffractive image, wherein:

each grating region of the diffractive structure comprises a plurality of grating elements arranged along a respective first direction, each grating element having a principal component of orientation within a plane of the optical device that is substantially orthogonal to the respective first direction;

the grating elements within each grating region have a constant respective pitch and substantially the same respective orientation such that each grating region, upon illumination, exhibits a diffractive colour such that the corresponding diffractive image is exhibited;

the diffractive structure comprises first and second grating regions that are both elongate along a common first direction, the first and second grating regions being adjacent along the common first direction, and wherein the pitch and/or orientation of the grating elements of the first grating region are different from the pitch and/or orientation of the grating elements of the second grating region; and at least one grating region is elongate along the respective first direction by a ratio of at least 2 to 1 such that a ratio of a dimension of the at least one grating region along the respective first direction to a dimension of the at least one grating region along a direction orthogonal to the respective first direction is at least 2 to 1.

2. The optical device of claim 1, wherein:

each grating region is elongate along the respective first direction by a ratio of at least 2 to 1.

3. The optical device of claim 1, wherein each grating region has a dimension along the respective first direction of 60 microns or less.

4. The optical device of claim 1, wherein the respective pitch and/or respective orientation of the grating elements of adjacent grating regions are different.

5. The optical device of claim 1, wherein each grating region comprises at least 20 grating elements arranged along the respective first direction.

6. The optical device of claim 5, wherein each grating region comprises at least 22 grating elements arranged along the respective first direction.

7. The optical device of claim 1, wherein the grating regions are arranged as one or more arrays corresponding to respective one or more of the diffractive images.

8. The optical device of claim 7, wherein for at least one array, the grating regions are arranged in accordance with a plurality of diffractive pixels of the corresponding diffractive image, each diffractive pixel being assigned a colour.

9. The optical device of claim 8, wherein for at least one array, each grating region covers a proportion of a diffractive pixel corresponding to the proportion of the diffractive colour of the grating region to be exhibited by the diffractive pixel such that the corresponding diffractive image is exhibited.

10. The optical device of claim 9, wherein, for at least one array, at least one grating region covers a proportion of its respective diffractive pixel area in accordance with a dithering arrangement.

11. The optical device of claim 8, wherein, for at least one array, the diffractive pixels are arranged as an arrangement of image elements, wherein each image element comprises at least one diffractive pixel corresponding to a first colour channel and at least one diffractive pixel corresponding to a second colour channel; wherein, the array comprises a plurality of first grating regions that upon illumination exhibit a diffractive colour corresponding to the first colour channel, and a plurality of second grating regions that upon illumination exhibit a diffractive colour corresponding to the second colour channel; wherein, each first grating region covers a proportion of a first diffractive pixel corresponding to the proportion of the first colour channel to be exhibited by the associated image element, and each second grating region covers a proportion of a second diffractive pixel corresponding to the proportion of the second colour channel to be exhibited by the associated image element, such that each image element exhibits a uniform colour.

12. The optical device of any of claim 11, wherein, for at least one array, each image element has a dimension of 100 microns or less.

13. The optical device of claim 8, wherein, for at least one array, each diffractive pixel is elongate along the respective first direction.

14. The optical device of claim 8, wherein, for at least one array, each diffractive pixel has a dimension along the respective first direction of 60 microns or less.

15. The optical device of claim 8, wherein, for at least one array, each diffractive pixel has a dimension orthogonal to the respective first direction of between 2 microns and 30 microns.

16. The optical device of claim 8, wherein, for at least one array, each grating region and diffractive pixel have substantially the same dimension along the respective first direction.

17. The optical device of claim 7, wherein the optical device exhibits two or more diffractive images dependent on viewing angle, and wherein the grating elements of the respective two or more arrays have different orientations within the plane of the device such that the two or more diffractive images are exhibited at different viewing angles.

18. The optical device of claim 17, wherein each of the two or more arrays are arranged as respective sets of diffractive image segments that in combination exhibit the respective diffractive image, and wherein the sets of image segments of the two or more arrays are interlaced with each other.

19. The optical device of claim 18, wherein a repeat distance of the interlacing is 100 microns or less.

20. The optical device of claim 1, wherein the grating elements within each grating region have a constant phase.

21. The optical device of claim 1, wherein the optical device is a security device.

22. A method of forming an optical device that, upon illumination, exhibits one or more diffractive images dependent on viewing angle, the method comprising:

forming a diffractive structure in a carrier layer, the diffractive structure comprising a plurality of grating regions, each grating region corresponding to a component of a respective diffractive image, wherein:

each grating region of the diffractive structure comprises a plurality of grating elements arranged along a respective first direction, each grating element having a principal component of orientation within a plane of the optical device that is substantially orthogonal to the respective first direction;

the grating elements within each grating region have a constant respective pitch and substantially the same respective orientation such that each grating region, upon illumination, exhibits a diffractive colour such that the corresponding diffractive image is exhibited;

the diffractive structure comprises first and second grating regions that are both elongate along a common first direction, the first and second grating regions being adjacent along the common first direction, and wherein the pitch and/or orientation of the grating elements of the first grating region are different from the pitch and/or orientation of the grating elements of the second grating region; and at least one grating region is elongate along the respective first direction by a ratio of at least 2 to 1 such that a ratio of a dimension of the at least one grating region along the respective first direction to a dimension of the at least one grating region along a direction orthogonal to the respective first direction is at least 2 to 1.

23. The method of claim 22, wherein the diffractive structure is formed in accordance with a template defining a plurality of diffractive pixels of the one or more diffractive images to be exhibited by the device, wherein the template is generated by, for each of the one or more diffractive images:

providing an arrangement of grid pixels;

providing a source colour image comprising a plurality of image pixels, each image pixel being assigned a colour;

based on the plurality of image pixels of the source image, generating a mask defining masked regions and non-masked regions of the grid pixels, wherein the non-masked regions define proportions of the grid pixels required to generate a version of the source image; and applying the mask to the arrangement of grid pixels so as to generate the template.

* * * * *